US008041139B2

(12) United States Patent
Ma

(10) Patent No.: US 8,041,139 B2
(45) Date of Patent: Oct. 18, 2011

(54) METHOD AND APPARATUS FOR CALCULATING THE BACKGROUND COLOR OF AN IMAGE

(75) Inventor: Huanfeng Ma, Drexel Hill, PA (US)

(73) Assignee: The Neat Company, Inc., Philadelphia, PA (US)

(*) Notice: Subject to any disclaimer, the term of this patent is extended or adjusted under 35 U.S.C. 154(b) by 632 days.

(21) Appl. No.: 12/205,767

(22) Filed: Sep. 5, 2008

(65) Prior Publication Data

US 2010/0061633 A1 Mar. 11, 2010

(51) Int. Cl.
*G06K 9/40* (2006.01)

(52) U.S. Cl. ....... 382/254; 382/100; 382/112; 358/3.21; 358/1.11; 358/448

(58) Field of Classification Search .......... 382/100–102, 382/112–114, 173–206, 254, 256–274; 358/3.21–3.32, 1.11, 448–466
See application file for complete search history.

(56) References Cited

U.S. PATENT DOCUMENTS

| | | | | |
|---|---|---|---|---|
| 5,272,764 A * | 12/1993 | Bloomberg et al. | ......... | 382/164 |
| 5,583,949 A * | 12/1996 | Smith et al. | .................. | 382/199 |
| 5,592,568 A * | 1/1997 | Wilcox et al. | ................. | 382/218 |
| 5,949,901 A * | 9/1999 | Nichani et al. | ................ | 382/149 |
| 6,061,476 A * | 5/2000 | Nichani | ........................ | 382/270 |
| 6,141,041 A * | 10/2000 | Carlbom et al. | .............. | 348/169 |
| 6,269,194 B1 * | 7/2001 | Nichani | ........................ | 382/270 |
| 6,546,123 B1 * | 4/2003 | McLaren et al. | ............. | 382/128 |
| 6,721,461 B1 * | 4/2004 | Nichani | ......................... | 382/270 |
| 6,771,816 B1 * | 8/2004 | Gaither | ......................... | 382/176 |
| 7,016,536 B1 | 3/2006 | Ling et al. | | |
| 7,069,240 B2 | 6/2006 | Spero et al. | | |
| 7,532,767 B2 * | 5/2009 | Oztan et al. | ................... | 382/268 |
| 7,634,150 B2 * | 12/2009 | Oztan et al. | ................... | 382/268 |
| 7,783,117 B2 * | 8/2010 | Liu et al. | ........................ | 382/232 |
| 2003/0156118 A1 * | 8/2003 | Ayinde | ......................... | 345/589 |
| 2005/0084173 A1 * | 4/2005 | Smith | ........................... | 382/256 |

OTHER PUBLICATIONS

Pratt, W., 'Digital Image Processing', Third Edition, pp. 253-262., 2001.

* cited by examiner

*Primary Examiner* — Manav Seth
(74) *Attorney, Agent, or Firm* — Woodcock Washburn LLP

(57) ABSTRACT

A method, device and computer readable storage media for enhancing an image for optical character recognition by detecting the edges of the image to create an edge detected image, binarizing the edge detected image to create a binary edge image for processing, dilating the binary edge image to create a dilated binary edge image, taking the XOR difference between the binary edge image and the dilated binary edge image to obtain a text boundary, superimposing the text boundary on the image and determining the pixels of the image that are covered by the text boundary, calculating the average grayscale value of the pixels of the image that are covered by the text boundary, and setting background pixels of the image to the calculated average grayscale value of the pixels of the image that are covered by the text boundary. The method optionally includes the steps of performing edge filling and hole filling on the binary edge image to create an updated binary edge image and filling holes in the dilated binary edge image to create an updated dilated binary edge image, whereby the XOR difference is taken between the updated binary edge image and the updated dilated binary edge image. The image may be binarized for optimal results after the background images have been set to the calculated average grayscale value of the pixels that are covered by the text boundary.

9 Claims, 29 Drawing Sheets

2401

METHOD AND APPARATUS FOR CALCULATING THE BACKGROUND COLOR OF AN IMAGE

TECHNICAL FIELD

This invention relates generally to image processing. More specifically, the invention relates to calculating a background color in digital documents that makes such documents easy to binarize, particularly when the documents contain text.

BACKGROUND

Techniques are known for removing noise from digital representations of data images obtained by digitally scanning documents and the like. The scanned documents are processed to identify objects within the scanned images that are, in turn, used to mask out the noise. For example, U.S. Pat. No. 7,016,536 discloses a method and apparatus for removing noise by building objects from reduced resolution representations of the scanned image and including the identified objects in a mask that is logically ANDed with the de-skewed representation of the scanned document. Objects identified as picture objects are included in a mask and logically ANDed with the de-skewed representation to eliminate all other objects, while objects marked as data objects are added to the representation to provide a de-skewed, de-speckled representation of the scanned document.

Binarization of an image involves translating grayscale values, typically 0 to 255, into binary values, 0 or 1. A common way to accomplish this mapping is to pick a threshold whereby all values under the threshold are mapped to 0 and all values above the threshold are mapped to a 1. Binarization of images is desirable prior to applying optical character recognition (OCR) techniques to a document for text recognition so that edges may be better detected. However, binarization is difficult in the case of noisy images where a noisy background adjacent to the text may lead to improper OCR conversion. It is desired to clean up such noisy background by determining the appropriate background color and assigning same to the portion of the document adjacent the text to be examined so that the OCR software may be more accurate. The present invention satisfies such needs in the art.

SUMMARY

The invention satisfies the needs in the art by providing a method of enhancing an image for optical character recognition by detecting the edges of the image to create an edge detected image, binarizing the edge detected image to create a binary edge image for processing, dilating the binary edge image to create a dilated binary edge image, taking the XOR difference between the binary edge image and the dilated binary edge image to obtain a text boundary, superimposing the text boundary on the image and determining the pixels of the image that are covered by the text boundary, calculating the average grayscale value of the pixels of the image that are covered by the text boundary, and setting background pixels of the image to the calculated average grayscale value of the pixels of the image that are covered by the text boundary. The method of the invention optionally includes the steps of performing edge filling and hole filling on the binary edge image to create an updated binary edge image and filling holes in the dilated binary edge image to create an updated dilated binary edge image, whereby the XOR difference is taken between the updated binary edge image and the updated dilated binary edge image. It is also desirable to binarize the image after the background images have been set to the calculated average grayscale value of the pixels that are covered by the text boundary.

The scope of the invention also includes computer readable storage media containing instructions that when processed by a processor cause the processor to implement such methods, as well as a processing device programmed by such instructions to implement the methods of the invention. All such features within the scope of the invention will become apparent from the following description in connection with the appended claims.

DETAILED DESCRIPTION OF ILLUSTRATIVE EMBODIMENTS

Preferred embodiments of the invention will be described in detail below with reference to FIGS. 1-41. Those skilled in the art will appreciate that the description given herein with respect to those figures is for exemplary purposes only and is not intended in any way to limit the scope of the invention. All questions regarding the scope of the invention may be resolved by referring to the appended claims.

Exemplary System

Figure 1:
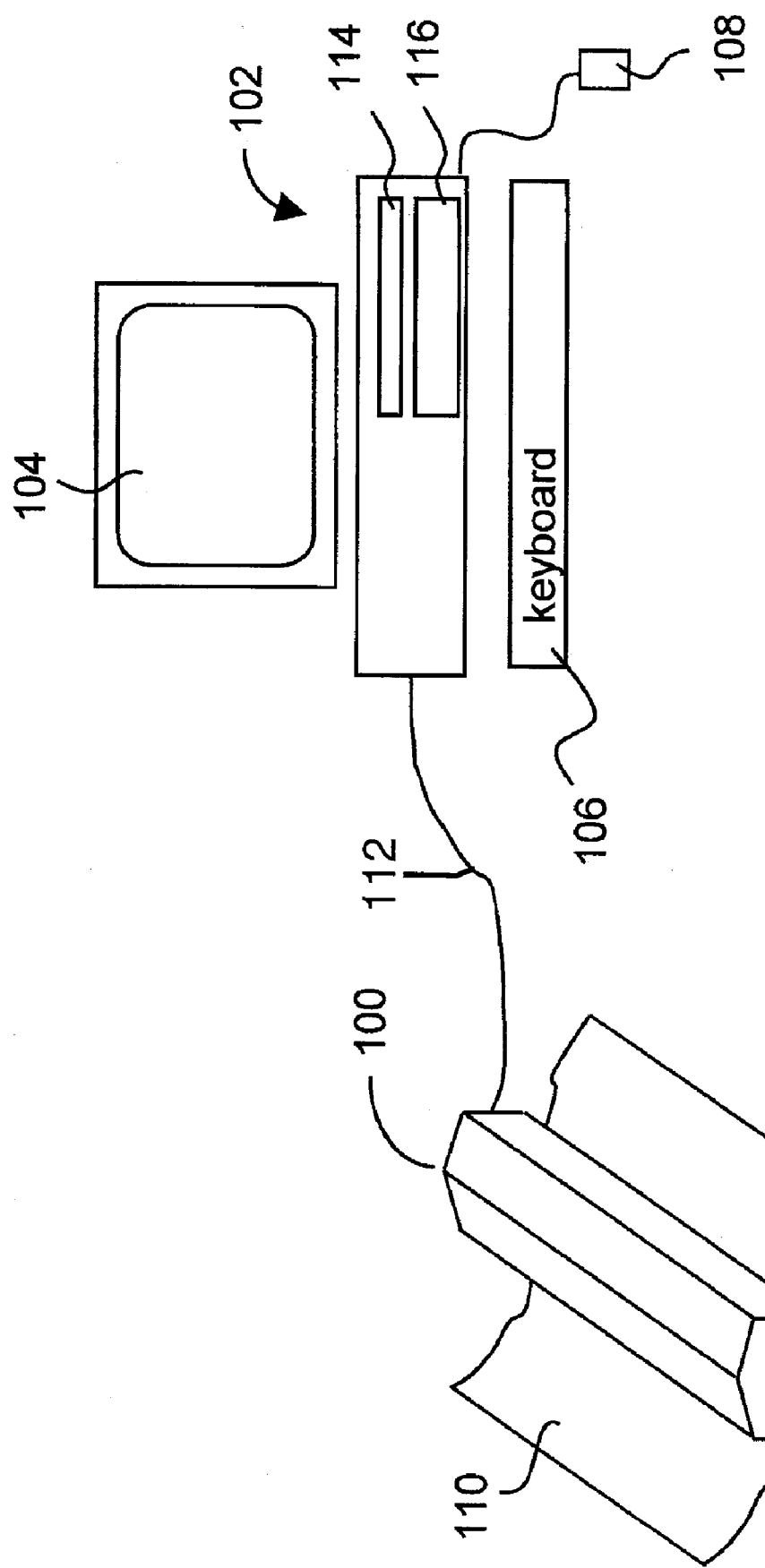
FIG. 1 illustrates a schematic diagram of a portable scanning system that may be adapted to provide contrast enhancement using the techniques of the invention.

FIG. 1 illustrates a schematic diagram of a portable scanning system that may be adapted to scan documents for classification using the techniques of the invention. As illustrated, sheet-fed scanner 100 is connected through communication cable 112 to a computing device 102, which may be a desktop or laptop computer, for example. Scanner 100 scans a sheet 110, which may be a sheet of paper, a receipt, a business card, or the like, and digitizes the text and graphics thereon in a conventional manner. The scanning result is generally a digital image that is transferred to the computing device 102 through communications cable 112. The digital image may then be manipulated by a computer program executed by computing device 102. The computer program as executed by computing device 102 may implement various aspects of the claimed method as explained below.

The computing device 102 includes a display monitor 104 on which the scanned image or manipulated image is displayed to users. Computing device 102 may optionally include a memory slot 114, a disk drive 116 for storing image files and application program files, and a keyboard 106 for providing data input. A mouse 108 is also provided to permit execution of commands by the computing device 102.

Figure 2:
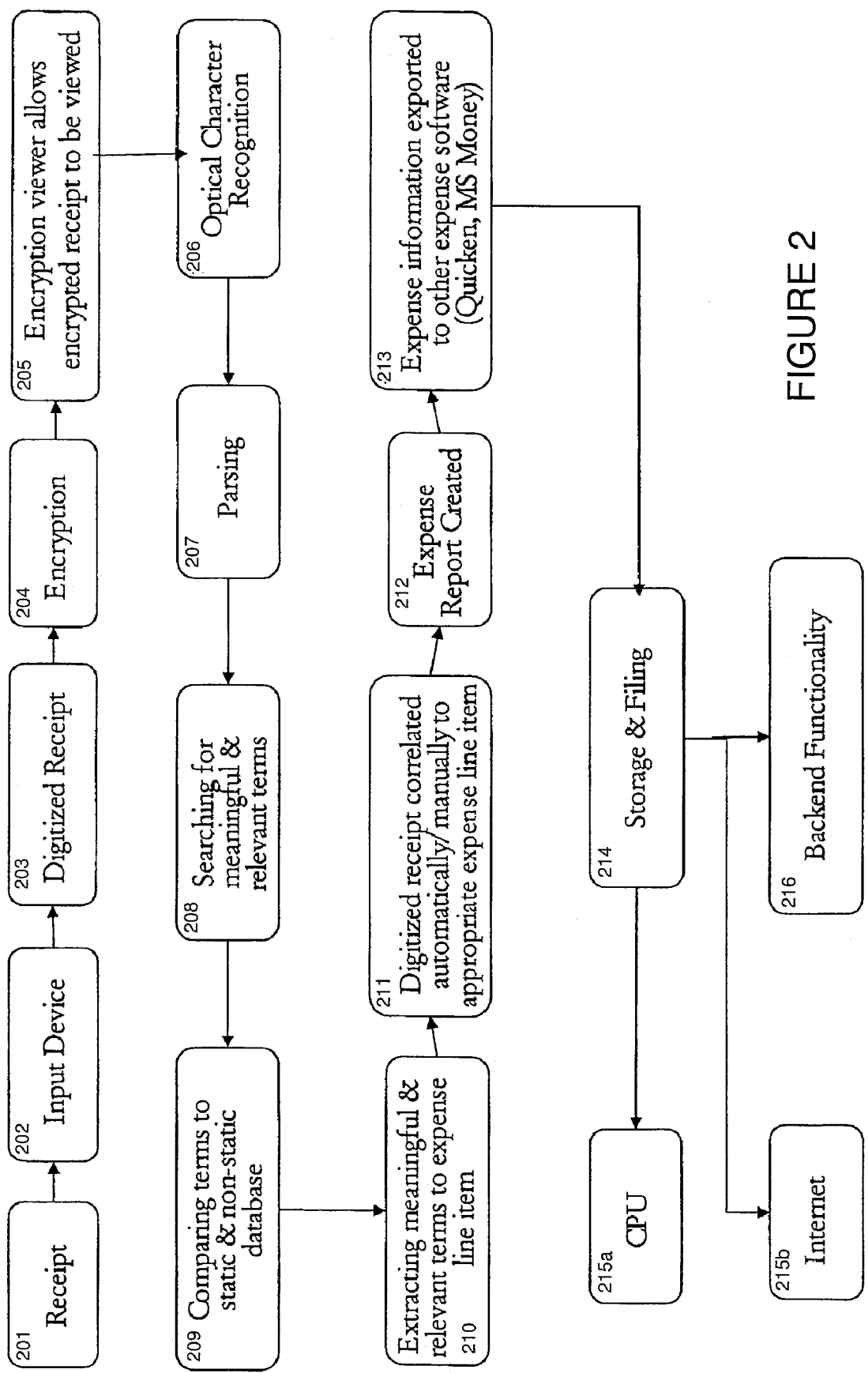
FIG. 2 illustrates a functional block diagram of an exemplary system for capturing, storing and processing documents for image processing using the techniques of the invention.

In an exemplary embodiment, the computer program executed by the computing device 102 of FIG. 1 analyzes the images received from the scanner 100, converts the images to text, analyzes the text data, extracts expense data, and puts the extracted expense data into an expense report. In another exemplary embodiment, the computer program executed by the computing device 102 of FIG. 1 analyzes business card or other documents images received from the scanner 100, converts the images to text, analyzes the text data, extracts contacts data, and puts the contacts data into a contacts database. FIG. 2 illustrates a functional block diagram of an exemplary system of the type described in U.S. Pat. No. 7,069,240 for capturing, storing and processing documents, such as receipts and business cards, for classification using the techniques of the invention. The contents of that patent are hereby incorporated by reference in their entirety.

FIG. 2 illustrates an embodiment for processing (and classifying) a receipt using the techniques of the invention. As illustrated in FIG. 2, the process begins with a document such as a paper expense receipt 201 of the type typically printed by a cash register or other point of sale device used by merchants. An input device 202, such as scanner 100 of FIG. 1, creates a digitized representation of the image of the receipt or other document 203. Preferably, the scanned document is encrypted 204 to prevent any tampering with the scanned image. For example, a proprietary encryption methodology may be used that can only be subsequently viewed by a compatible viewer 205. After the digital image is received by the computing device 102, the image data may be converted into alpha-numeric strings 206 using software routines such as optical character recognition (OCR) and/or image character recognition (ICR) for handwriting recognition. Such software routines are well-known in the art and will not be described further herein. The process of converting the image into alpha-numeric data may also include image enhancement techniques such as noise filtering, contrast enhancement, edge filtering, sharpening, and other image enhancement techniques such as those described below. Preferably, the OCR/ICR process also preserves some of the spatial information with respect to where the text is on the receipt so as to facilitate parsing of the alpha-numeric text at 207 in order to find particular information. The parsing may identify certain text such as the date and amount (where the document is a receipt) and also look for the vendor name. Also, the document may be searched for meaningful terms and values at 208. For example, if the document is a receipt, the receipt may be searched for common terms at 208. Because most receipts possess similar information, the software may search the receipt text for a list of common terms within the receipt text, such terms including, for example, "amount," "total amount," and/or "amount due." The receipt text may also be searched for known date formats. The software may also utilize a static and non-static database of popular vendors at 209 to facilitate the filing of the expense description category in an expense report. For example, if the receipt reads McDonalds, then the software may recognize that McDonalds is a restaurant and automatically select meals from the expense description category in the expense report. Once the software locates the terms within the receipt text, the corresponding dollar amount or other relevant data (date, location, etc.) is extracted at 210 and placed into the appropriate expense report line item category and correlated to an expense line item at 211 to build an expense report at 212. The information in the expense report may also be imported into other popular expense software such as Quicken and MS Money at 213 and may be customized to interact with specific corporate systems including storage and filing system 214, processor 215a, Internet connection 215b, and backend system 216.

Image Enhancement and Binarization Techniques

Techniques for enhancing and binarizing gray scale receipt images of the type captured by the system described above with respect to FIGS. 1 and 2 will be described herein in the context of exemplary embodiments. However, those skilled in the art will appreciate that the techniques described herein may be extended to the enhancement and binarization of other types of gray scale document images with little or no change.

Given a gray scale image with relatively low image quality, enhancing and binarizing such an image is not a trivial task. Especially when the image has contrast variances in different areas, a difficult trade-off between foreground content and background noise must be made. To enhance and binarize a category of images (e.g. receipt images) make the task even more difficult because the same parameters that work perfectly for one image often will not work for another image, and certainly not for all images. Therefore, parameters used to enhance and binarize images must be decided adaptively based on some criteria, often based on image quality.

Figure 3:
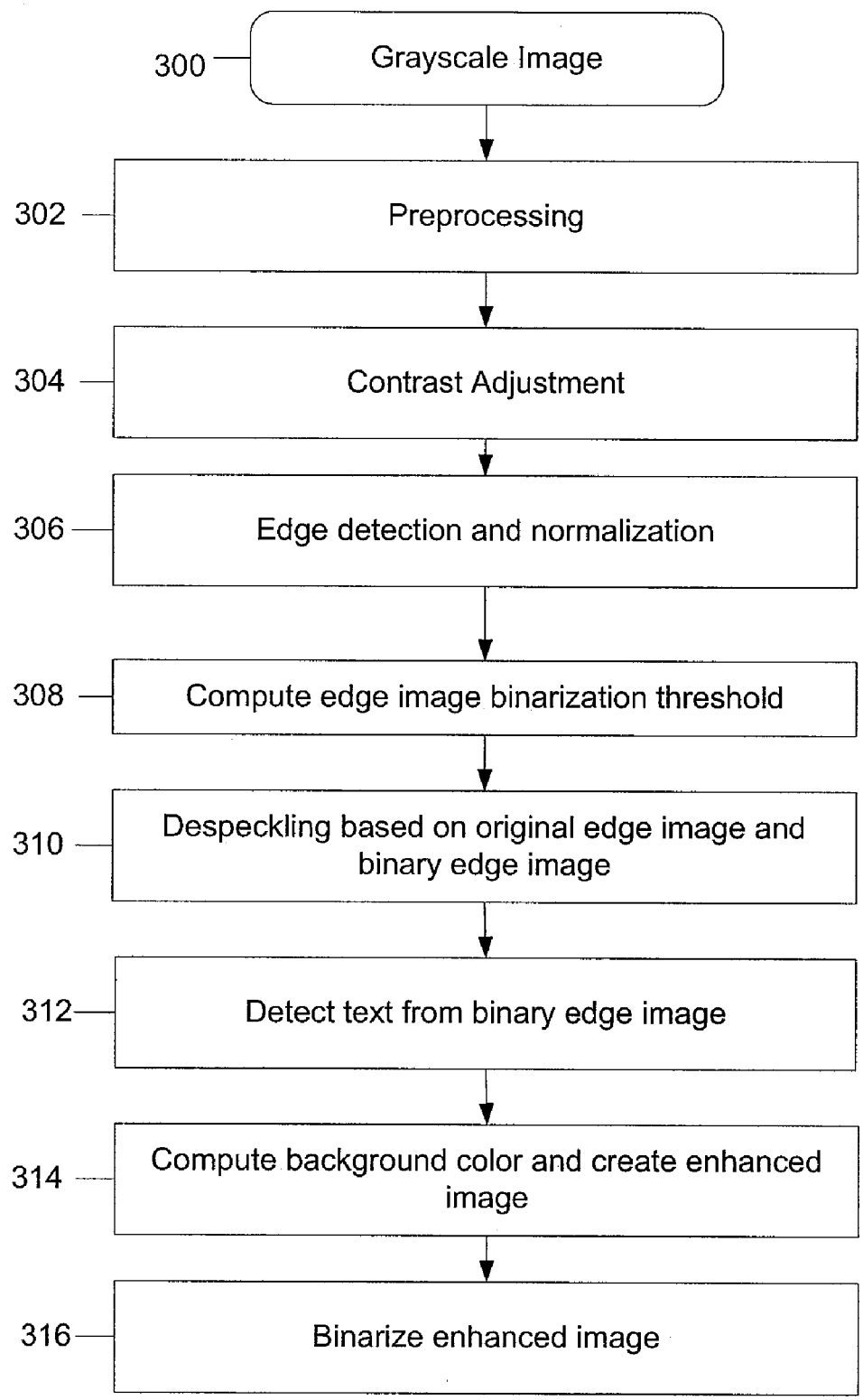
FIG. 3 illustrates a flow chart of image processing techniques for enhancing and binarizing gray scale images in accordance with the invention.

FIG. 3 illustrates a flow chart of image processing techniques for enhancing and binarizing gray scale images in accordance with the invention. The approach can be divided into the following components based on the major functionality of each component: (1) Preprocessing; (2) Text detection; (3) Object image enhancement; and (4) Object image binarization. As illustrated in FIG. 3, the image processing technique of the invention processes gray scale image 300 by subjecting it to preprocessing at 302, contrast adjustment at 304, edge detection and normalization at 306, computation of the edge image binarization threshold at 308, despeckling based on the original edge image and binary edge image at 310, detection of the text from the binary edge image 312, computation of the background color and creation of an enhanced image at 314, and binarization of the enhanced image at 316. In exemplary embodiments, the binarized enhanced image is provided to optical character recognition (OCR) software for further processing. Each component of this process is described in detail below.

Preprocessing

As illustrated in FIG. 3, an input gray scale image 300 is first subjected to preprocessing 302 before enhancing the gray scale image. For example, preprocessing at step 302 may include image smoothing for reducing noise. Besides removing image noise, the smoothing operation may also cause blurry edges and lost details in smoothed images. To address this, in an exemplary embodiment 3×3 Gaussian low-pass filter masks may be used to smooth the image as follows:

$$I_s(i,j) = I(i,j) \otimes g(i,j) = \sum_{m=-1}^{1} \sum_{n=-1}^{1} I(i+m, j+n)g(m,n)$$

where $I(i,j)$ and $I_s(i,j)$ represent the pixel at position $(i,j)$ in the original and smoothed images, respectively. The Gaussian filter mask is defined as:

$$g = \begin{bmatrix} 0.04 & 0.12 & 0.04 \\ 0.12 & 0.36 & 0.12 \\ 0.04 & 0.12 & 0.04 \end{bmatrix}$$

Contrast Adjustment

Contrast adjustment at 304 is very useful for improving the quality of images with low contrast. Given an image with minimum and maximum pixel values $p_{min}$ and $p_{max}$, the contrast of the image can be adjusted based on the following formula, where $I(i,j)$ and $I_{adj}(i,j)$ are the original and adjusted pixel values at position $(i,j)$, respectively, and the pixel may have one of R grayscale values (typically R=256):

$$I_{adj}(i,j) = \frac{(R-1)(I(i,j) - p_{min})}{p_{max} - p_{min}}$$

Figure 4:
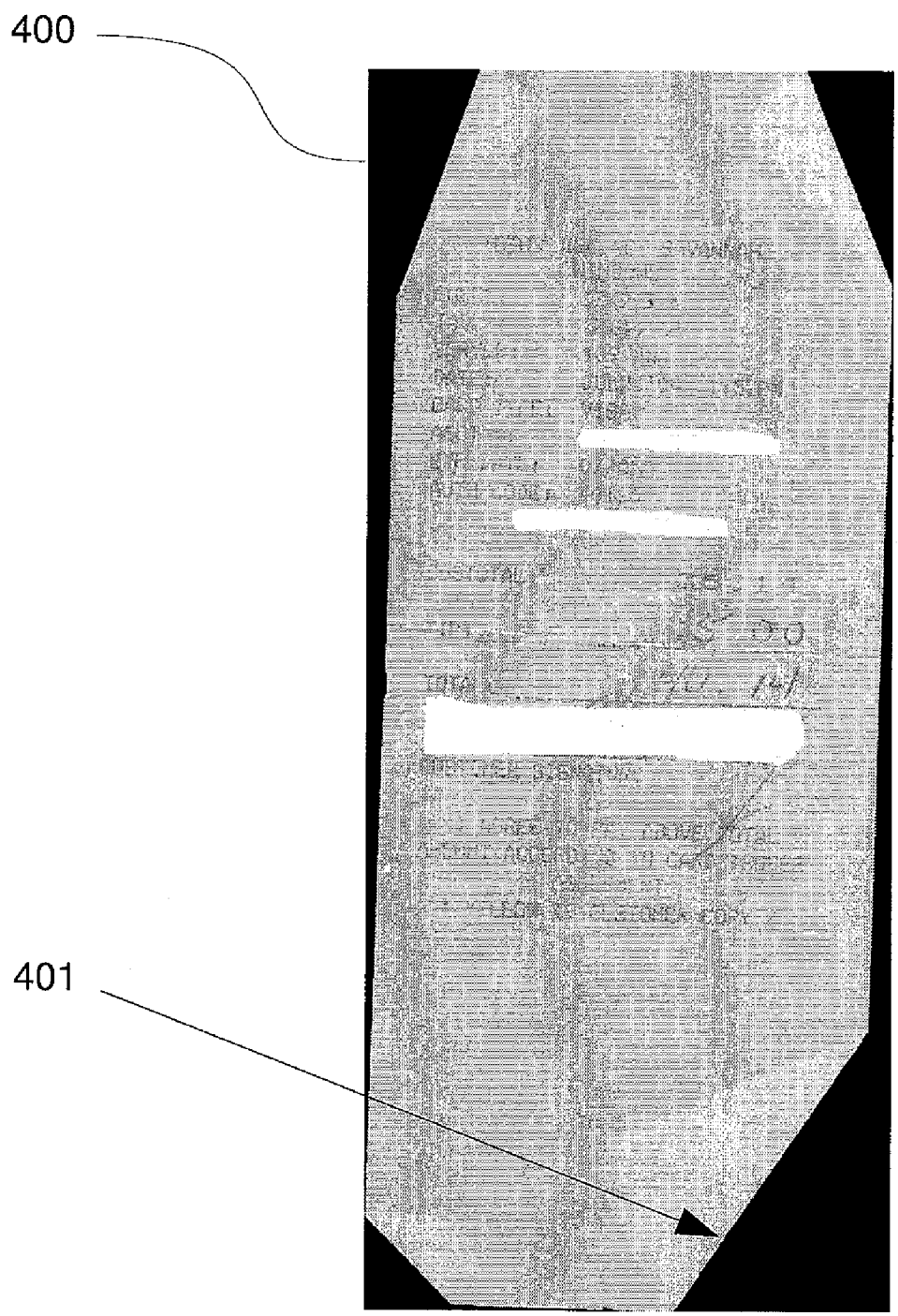
FIG. 4 illustrates a scanned document image with a black border to be removed in accordance with the image processing techniques of the invention.
Figure 5:
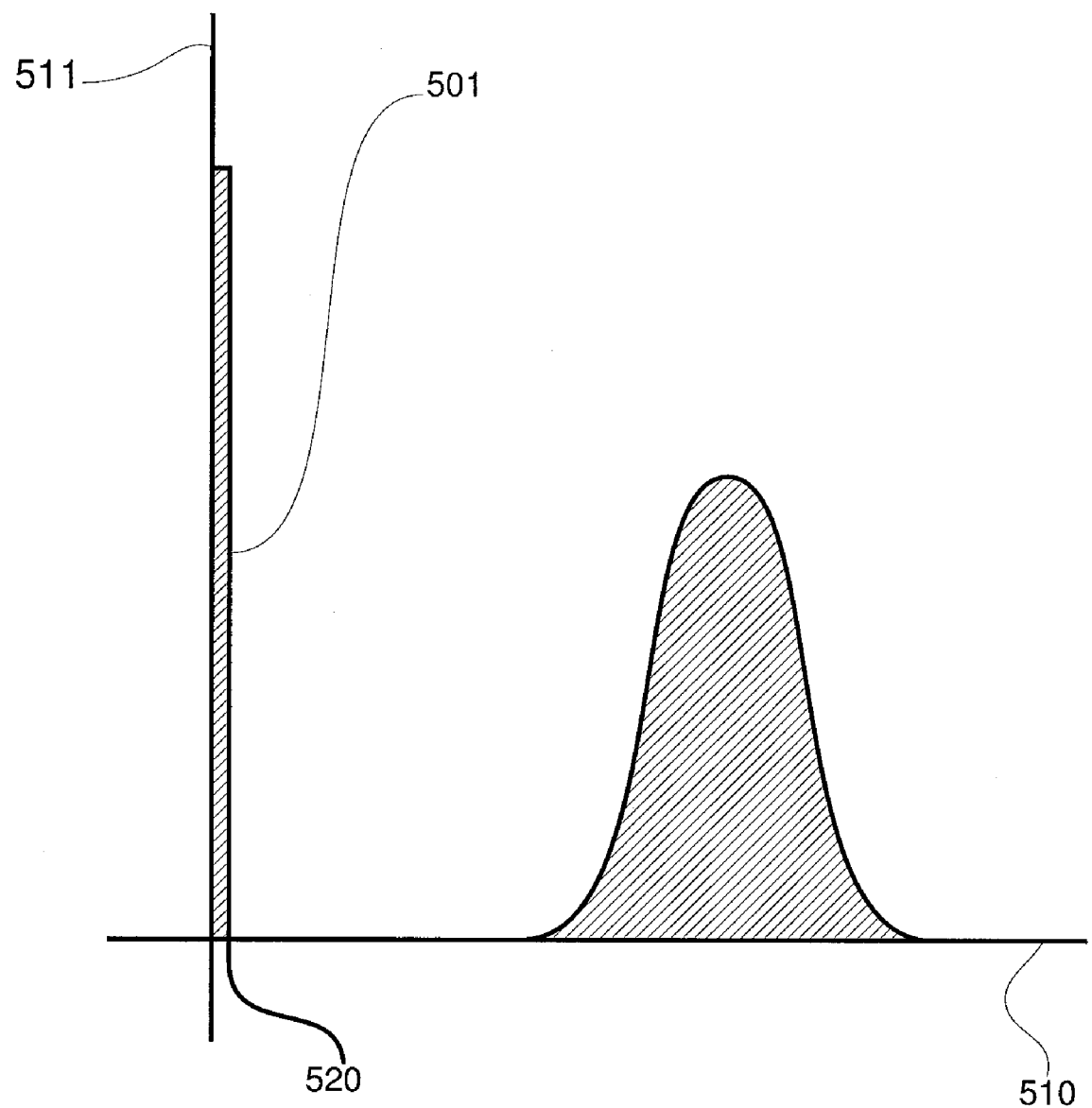
FIG. 5 illustrates the histogram of the image of FIG. 4 before it has been modified in accordance with the methods of the invention.

However, images of scanned documents, such as image 400 shown in FIG. 4, often contain large areas of black color 401 around the border area where the scanner sensor was not covered by the paper. This abundance of black color at 520 creates a spike 501 in the histogram on axes 510, 511 of the image (see FIG. 5). This spike 501 makes traditional contrast adjustment methods, such as the one disclosed in William Pratt's book "Digital Image Processing" (third edition, pp. 253-262), unreliable. In other words, in practical situations, the minimum and maximum values are often not the real minimum and maximum values but decided from the image histogram based on a specified percentage. As shown in FIG. 5, in scanned images, because of the scanning background, the histogram almost always has a peak value at position 0 which means $p_{min}$ is always 0. The impact is that the contrast can not be really improved for the real object of interest (i.e. text) in the image. Therefore, a method for minimizing the impact of the scanning background has been developed for use in an exemplary embodiment of the invention.

A method and apparatus providing contrast adjustment that improves the quality of contrast adjustment for scanned documents with a dark scanning border is obtained in accordance with the invention by modifying the histogram of the picture before the image is processed by a contrast adjustment algorithm. The method of the present invention accomplishes this task by modifying the histogram shown in FIG. 5 by reducing the number of black pixels in spike 501. In FIG. 5, the axis 510 represents the brightness, and axis 511 represents the number of pixels in the image with a given brightness. For each black pixel that appears in the border 501 of the grayscale image 500, the histogram density 501 corresponding to the black color is reduced by one. As used herein, the term "black pixel" is used to denote any pixel with brightness below some predetermined threshold; similarly the color "black" denotes all shades that have intensity below a predefined threshold. In an exemplary embodiment, any pixel having a brightness level less than 42 is considered to be a black pixel. However, it should be understood that other thresholds may be utilized as known to those skilled in the art.

An exemplary embodiment of the invention finds all the black connected components that touch at least one of the four margins of the image. Algorithms for finding connected components in images are common knowledge for those having ordinary skill in the art of image processing. The number of pixels in these connected components are counted and the histogram density at the spike 501 is reduced by that number. In an alternative embodiment, the histogram density at the spike 501 is reduced by some function of the number of pixels found in the black connected components that touch at least one of the margins of the image. In yet another alternative embodiment, the grey scale image 401 of FIG. 4 may be binarized with a threshold of 42. Binarization is process of mapping gray scale values of an image to binary values (0 or 1). Using a threshold of 42 simply means that all the pixels with value below 42 are mapped to 0, and all the pixels with intensity value over 42 are mapped to 1. Of course, other thresholds for the color black may be used in alternate embodiments. The binarized image is then used to find the connected components that touch at least one margin of the image.

Figure 6:
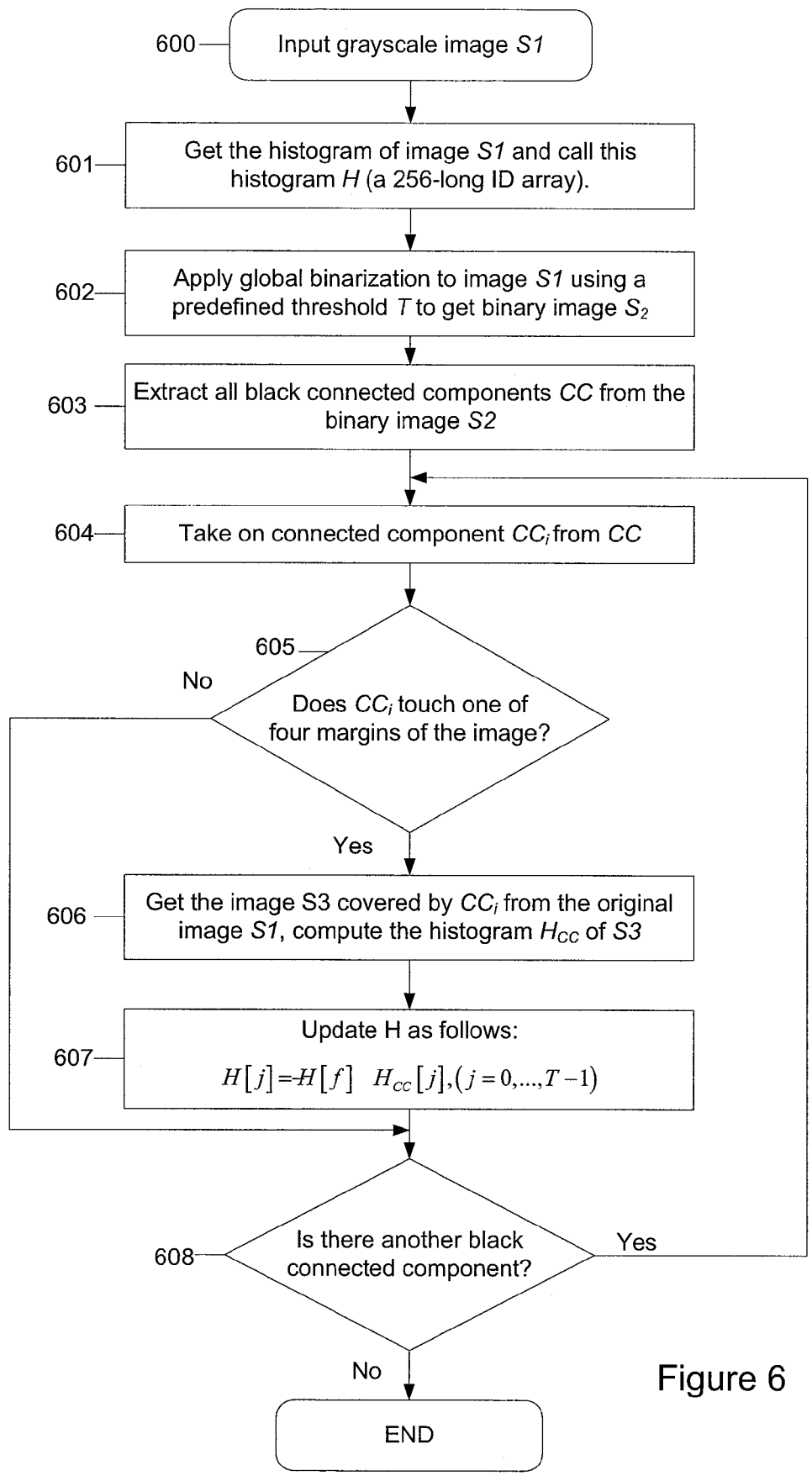
FIG. 6 illustrates the flowchart of the method of modifying the histogram of an image in accordance with the methods of the invention.

FIG. 6 illustrates the flowchart of the method of modifying the histogram of an image in accordance with the methods of the invention. As illustrated in FIG. 6, the method may be implemented as a computer program running on the computing device 102, for example. The method starts by reading in the grayscale image S1 at 600 and getting the histogram of image S1 at 601. The histogram of image S1 is called the histogram H and, in the case of 256 gray scale values, is a 256-bit long 1-dimensional array. Global binarization is applied to the image S1 at 602 using a predefined threshold T in order to obtain a binary image S2. At 603, all black connected components CC are extracted from the binary image S2 in a conventional manner. Then, at 604, a connected component $CC_i$ is taken from the connected components CC for processing. In particular, it is determined at 605 whether the connected component $CC_i$ touches one of the four margins of the image and, if so, the image S3 covered by $CC_i$ is obtained from the original image S1 and the histogram $H_{CC}$ of image S3 is calculated at step 606. At 607, the histogram value of histogram H is reduced for the black color by the value of the counter i as follows:

$$H[j]=H[j]-H_{CC}[j], (j=0,\ldots,T-1)$$

In an alternative embodiment, the value of the histogram H for the color black is reduced by some function of counter i. In other words, as the value of internal counter, i, is increased by the number of pixels in the connected component that was found, the histogram H for the color black is correspondingly reduced. Similarly, the histogram of the image may also be modified by reducing the histogram as a function of the size of the document whereby pixels outside of the document boundaries are removed from the histogram. Finally, at 608, the black connected components CC are checked to see if there is another black connected component $CC_i$. If so, the steps 604-607 are repeated; otherwise, the process ends.

In an exemplary embodiment, the contrast is adjusted using a contrast adjustment program in which the $p_{max}$ and $p_{min}$ for the pixels are calculated from the modified image histogram in the following way. Given a percentage value c, the image histogram h, and assuming that the total image pixel number is N, then $p_{min}$ and $p_{max}$ for the pixels of the image are decided as follows:

$$p_{min} = \arg\max_{0 \le p \le R-1} p \in \left\{ x \,\middle|\, \sum_{i=0}^{x} h(i) \le (c\%\cdot N) \right\}$$

$$p_{max} = \arg\min_{0 \le p \le R-1} p \in \left\{ x \,\middle|\, \sum_{i=x}^{R-1} h(i) \le (c\%\cdot N) \right\}$$

And the contrast adjustment is actually:

$$I_{adj}(i,j) = \begin{cases} 0 & I(i,j) \le p_{min} \\ \frac{(R-1)(I(i,j)-p_{min})}{p_{max}-p_{min}} & p_{min} < I(i,j) < p_{max} \\ R-1 & I(i,j) \ge p_{max} \end{cases}$$

which means c % of image pixels are saturated at low and high intensities, where R typically equals 256. This is a standard contrast adjustment technique.

Figure 7:
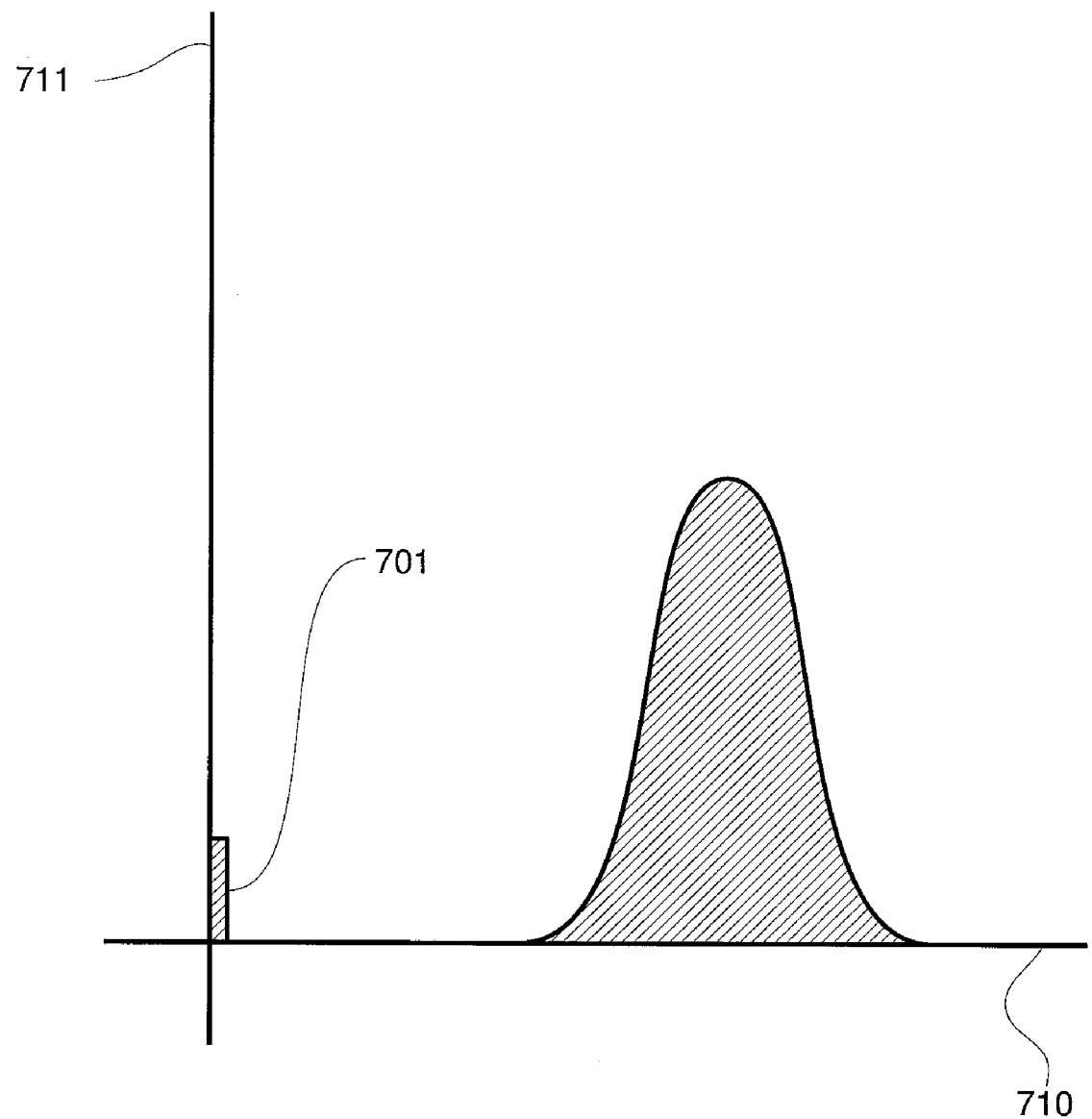
FIG. 7 illustrates the histogram of the image of FIG. 4 after it has been modified in accordance with the methods of the invention.
Figure 8:
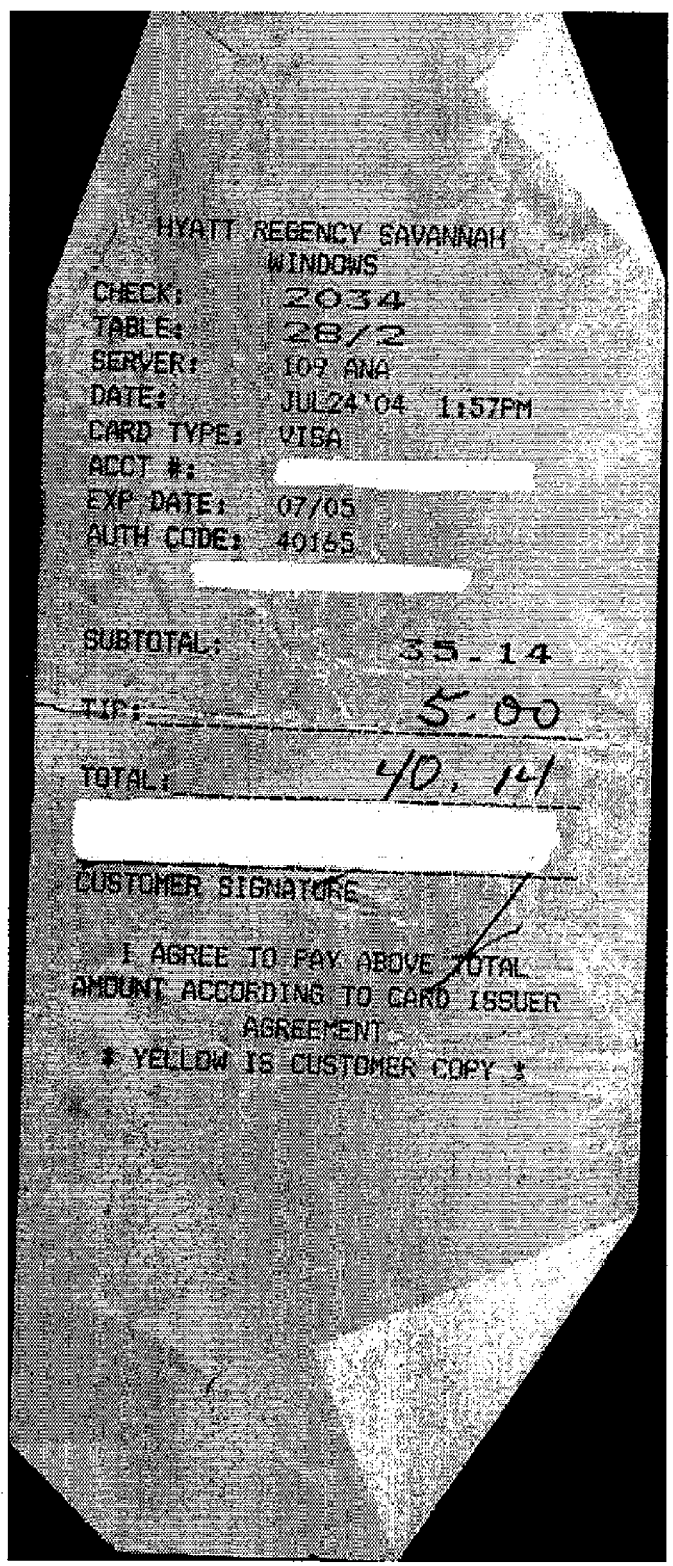
FIG. 8 illustrates the scanned document image of FIG. 4 after a contrast adjustment in accordance with the invention was performed.

FIG. 7 illustrates the contrast adjusted image using this modified histogram. In FIG. 7, the axis 710 represents the brightness, and axis 711 represents the number of pixels in the image with a given brightness. As shown, the peak 701 is significantly smaller than the peek 501 of FIG. 5. All the other parts of the histogram are the same. The modified histogram can now be used as an input for conventional contrast adjustment. In the case of FIG. 7, the contrast adjustment was done using a linear transformation of the innermost 98-percentile of the modified histogram. This kind of contrast adjustment is commonly used by those having ordinary skill in the art of image processing. FIG. 8 illustrates the scanned document image of FIG. 4 once such a contrast adjustment has been performed.

Edge Binarization Based on Background Noise Estimation

Figure 9:
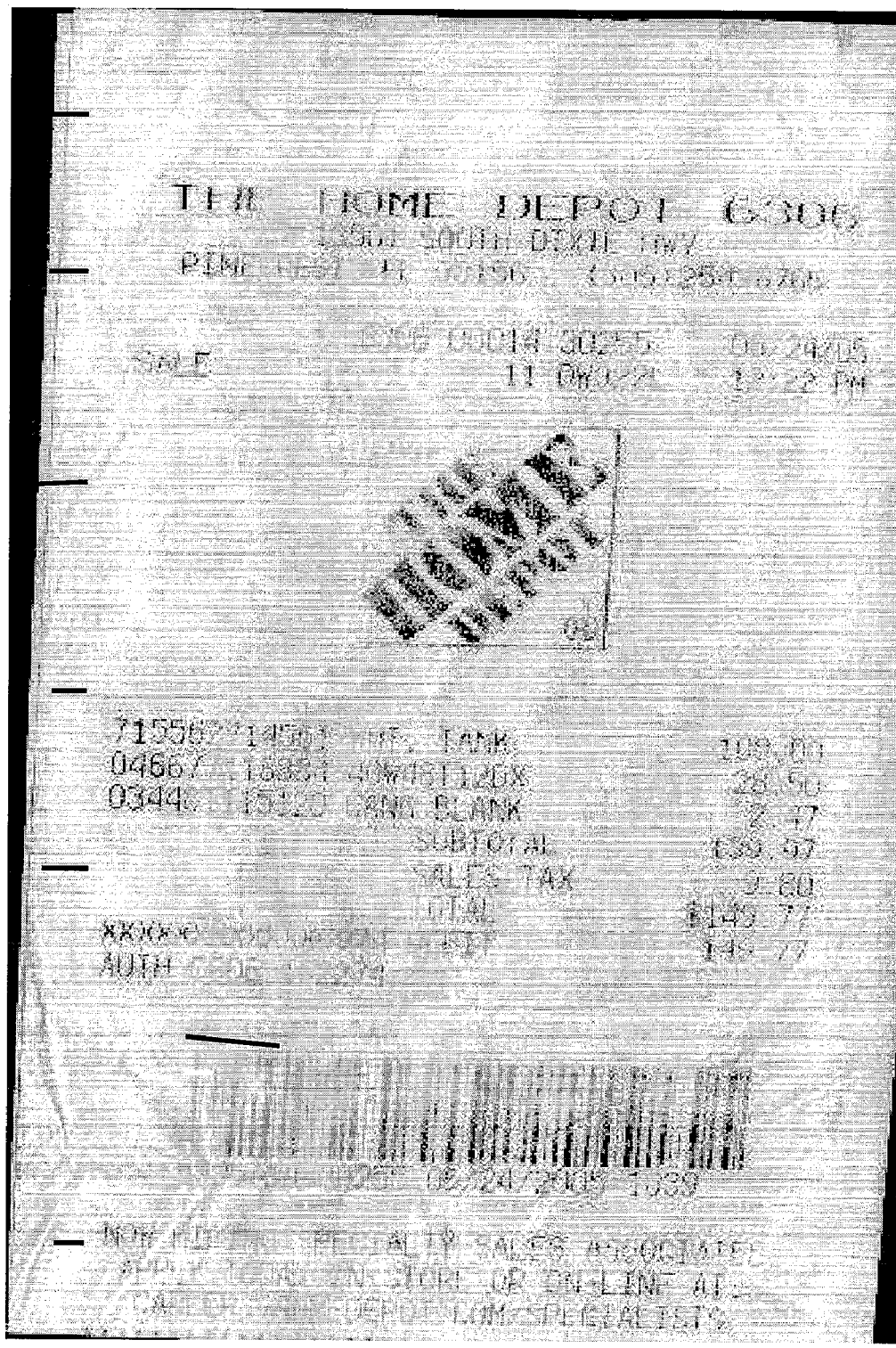
FIG. 9 illustrates a receipt before binarization in accordance with the methods of the invention.

Binarization of an image involves translating grayscale values, typically 0 to 255, into binary values, 0 or 1. A common way to accomplish this mapping is to pick a threshold whereby all values under the threshold are mapped to 0 and all values above the threshold are mapped to a 1. In images with little noise, the quality of the binarization does not depend on the threshold values in that there is a wide range of thresholds that can binarize the images with satisfying results. On the other hand, images with lots of noise are very sensitive to the threshold value. FIG. 9 illustrates an image of a document (receipt) that is degraded and is challenging to binarize. An exemplary embodiment of a binarization threshold determination technique will be described with respect to FIGS. 10-14.

In an exemplary embodiment, edges are detected and used for detecting text areas and removing noise. Since edges are normalized to the range [0, R−1] (or [0,255] for an image having R=256 gray scale values), several edge detectors can be chosen to give the same result. In an exemplary embodiment, a Prewitt edge operator may be used to detect edges in 4 different directions. The detected edges are normalized to the range [0, R−1] using the same approach described above regarding contrast adjustment. However, in this case, the percentage value c is a constant value 1. Given the percentage value 1, the minimum and maximum edge pixels are determined from the edge histogram and the edges are then normalized to the range [0, R−1] based on these two values. Normalized edges are then processed for text detection and also saved for post-processing binary images.

Given a clean image, only those positions where text interlaces with background are there non-zero edges. However, because of the noise on a real scanning image, after normalization, edges of noise areas often have a distribution which can be estimated as a Gaussian distribution. Compared with the distribution of real texts, this distribution often has a smaller mean value. The objective of background noise estimation is to determine a threshold which can binarize edges into boolean values as described below. On the other hand, the objective of text detection is to detect text areas from images and to remove background noise simultaneously. Once the image noise estimation is estimated, the obtained noise information can be used to remove noise.

In order to remove noise, a threshold T is determined based on the estimated noise distribution to binarize the edge image. In this way, most of the noise with relatively low contrast is removed after binarization. The way to decide the binarization threshold is based on the observation that images with little noise are usually not very dependent on the threshold. In other words, there is a wide range of thresholds that can binarize edges of good images with satisfying results. Images with much noise are usually more sensitive to the threshold. Therefore, in an exemplary embodiment, a number of noisy images in an image set C were used to simulate the correlation between estimated noise distribution and the threshold. The process to decide the correlation is explained below in connection with alternate embodiments.

Figure 10:
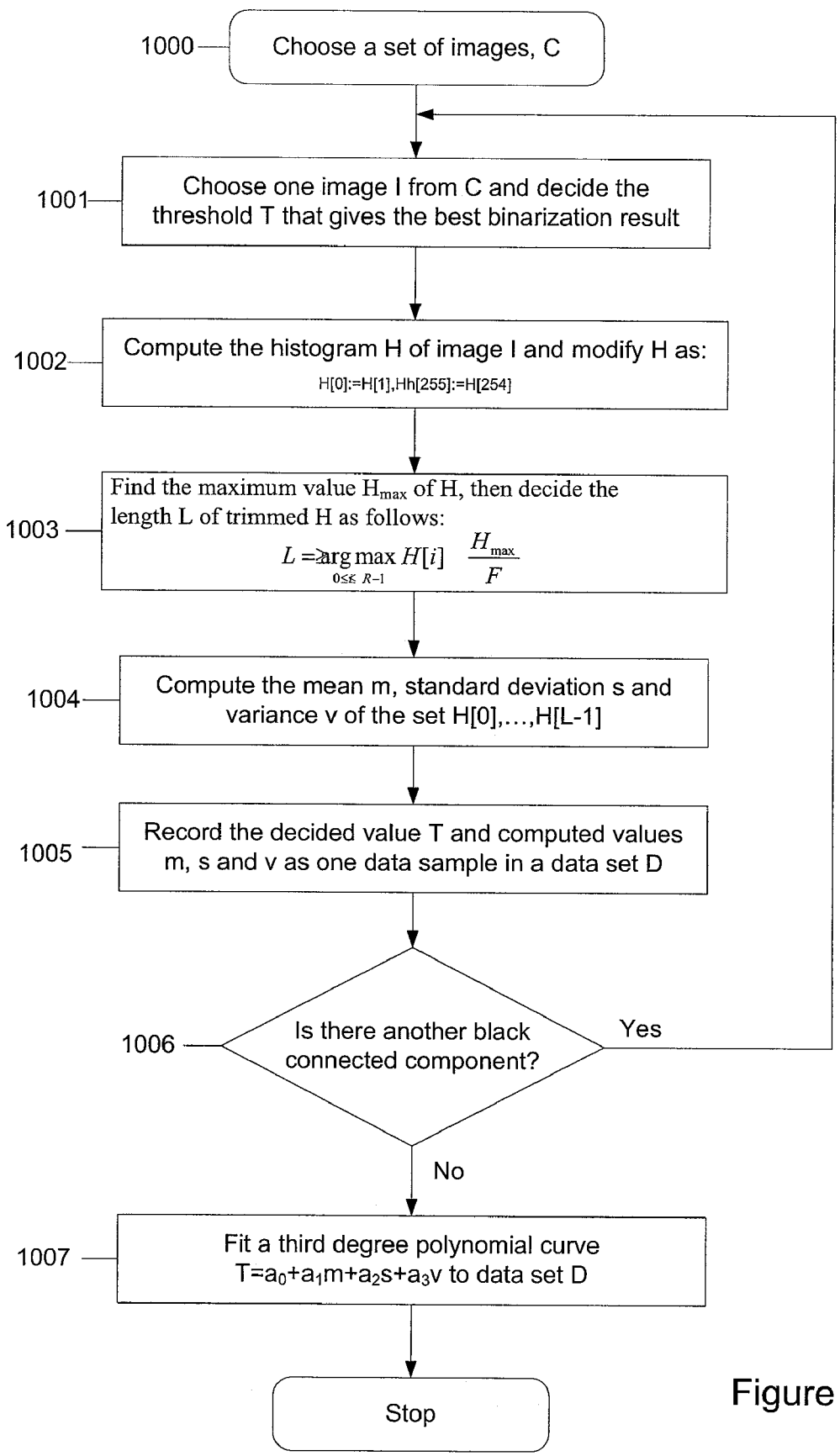
FIG. 10 illustrates the method of calculating the optimum binarization threshold in accordance with an embodiment of the invention.

As illustrated in FIG. 10, the process of computing the edge binarization threshold begins by selecting a set of images, C, at step 1000 that will be used to establish a relationship between the properties of the histogram and the optimal binarization threshold. After the images C to be used in this process have been selected, the user manually determines the optimal binarization threshold T for each of the images in the set as explained below.

Figure 11:
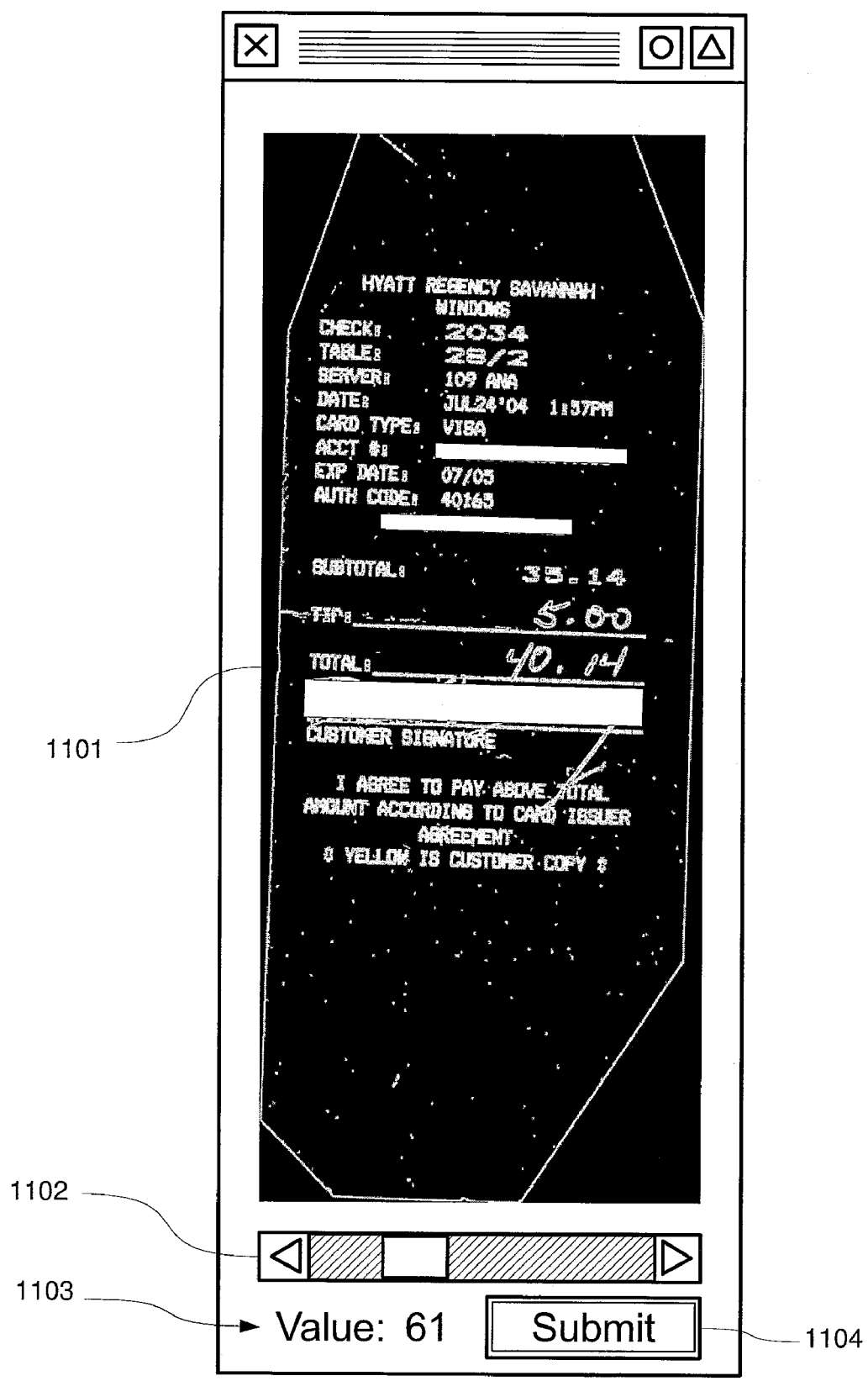
FIG. 11 illustrates the graphical user interface used to determine the optimal binarization threshold for an individual image.

There are two major ways to find the optimal binarization threshold T for a given image in accordance with exemplary embodiments. A first way is a single image-based approach in which a graphical user interface was designed to import one single edge image every time and to display the binarization result. As shown in FIG. 11, a graphical user interface input means such as slider 1102 with range $[T_{min}, T_{max}]$ was set to change the threshold T continuously, where $T_{min}$ and $T_{max}$ are the minimum and maximum possible thresholds that can be used to binarize the edge image. Once a satisfying binarization result is achieved (a best tradeoff of noise reduction and keeping the target object), the slider value (threshold T) is recorded for that image. As shown in FIG. 10, this process is implemented at 1001 by displaying one image, 1101, from C at a time and to letting the user adjust the binarization threshold T using the slider 1102 illustrated in FIG. 11. The user visually inspects the image at various threshold values. When the user finds the optimal binarization threshold T for the given image, the user presses the "submit" button 1104. The current threshold value is displayed in the text area 1103.

Once the optimal binarization threshold for image I is submitted, the histogram H of the image I is computed and H (one-dimensional array with length 256) is modified at step 1002 to ignore the values of H[0] and H[255] by updating H as:

H[0]:=H[1]; H[255]:=H[254]

for a R=256 bit binarization. In other words, H[MAX]:=H[MAX−1]. The gray areas on the image are identified by trimming the histogram H to length L. Pixels with values in the range of [0,L−1] are identified as gray areas, and L is found by finding the maximum value $H_{max}$ of H at step 1003 and by determining the length L of trimmed histogram H as:

$$L = \arg\max_{0 \leq i \leq R-1} H[i] \geq \frac{H_{max}}{F}$$

where F is an empirically determined factor used to reduce the maximum value of the histogram. Some statistical information such as the mean m, standard deviation s, and variance v of the histogram H of each image of the set H[0], . . . ,H[L−1] are then calculated at step 1004. The threshold T, the computed values m, s and v, together with the link to the image, are then stored in a file or database as data set D at step 1005. A determination is then made at step 1006 as to whether there is another image 1101 in set C. If so, the user is then given the next image to examine for threshold coding. Once all of the images in the image set C are coded, a third degree polynomial curve $T=a_0+a_1 m+a_2 s+a_3 v$ is fit to the data set D at step 1007 and the process ends.

Figure 12:
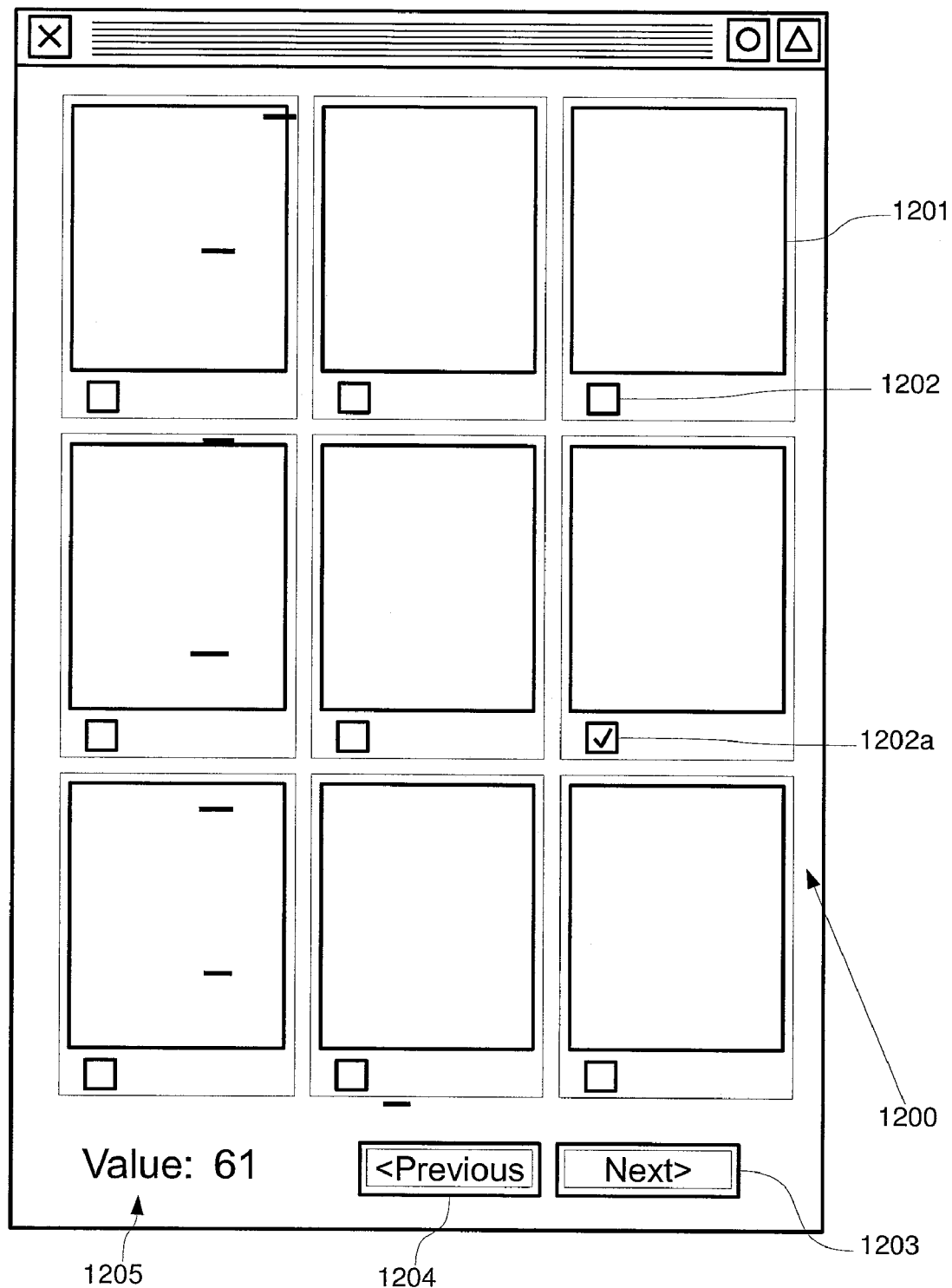
FIG. 12 illustrates the graphical user interface used to determine which images from a collection of images have the optimal binarization threshold.

A second way to find the optimal binarization threshold T is the multiple image-based approach illustrated in FIG. 12. In this method, the same threshold range $[T_{min}, T_{max}]$ is used and a different threshold value is applied to all images at the same time to perform binarization. Images with satisfying binarization results are removed and the threshold value stored for those images. The same operation with changed threshold is iterated until a best threshold value is found for every image. This process is implemented as shown in FIG. 12 by presenting the user on display 1200 all the images, 1201, from the image set C. The threshold value is displayed in the text area 1205. For an R=256 bit binarization, the binarization threshold starts at 0 and cycles to 255. At each threshold value, the user is asked to pick those images that have an acceptable binarization at the given threshold value. The user chooses the images by clicking on the checkbox, 1202, associated with the image. When the user checks a given image, a checkmark appears in the checkbox, 1202a. This causes the threshold values, together with the link to the image, to be stored in a file or database. When the developer has finished choosing the images that have acceptable binarizations at the given threshold value, the user can click on the Next button, 1203, to move on to the next binarization value. The user can also choose to go back to previous threshold values by clicking the Previous button, 1204. Once the optimal binarization threshold for each image 1201 is submitted, processing may continue with steps 1002-1007 as described above with respect to the embodiment of FIG. 11.

Figure 13:
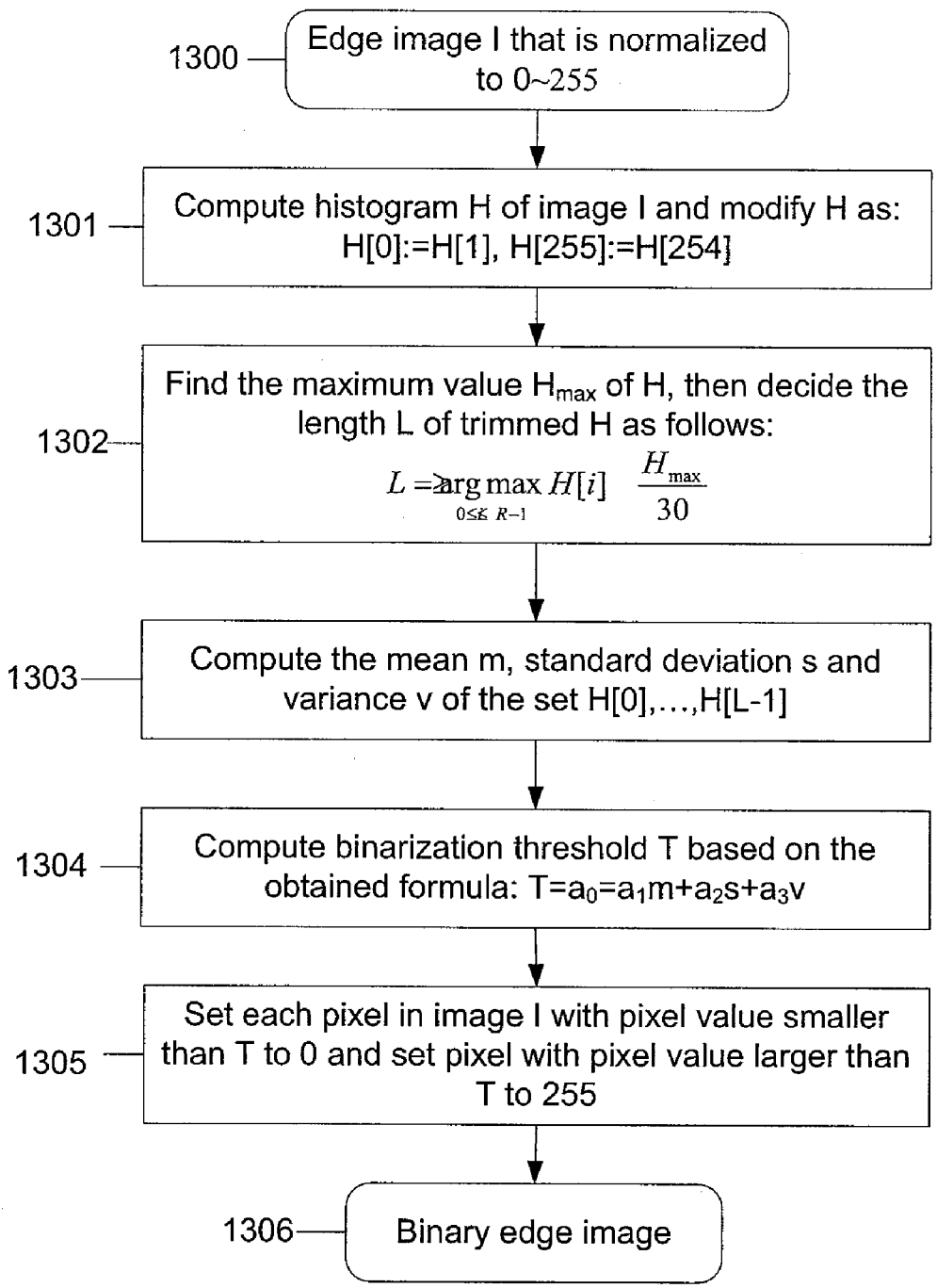
FIG. 13 illustrates a method of binarizing an edge image in accordance with an embodiment of the invention.

FIG. 13 illustrates a method of binarizing an edge image in accordance with an embodiment of the invention. This method is essentially the same as the method of FIG. 10 except that, as noted above, the detected edges are normalized at step 1300 to the range [0, 255] where the percentage value c is a constant value 1. Given the percentage value 1, the minimum and maximum edge pixels are determined from the edge histogram and the edges are then normalized to the range [0, 255] based on these two values. Steps 1301-1303 are the same as steps 1002-1004, respectively. However, in the edge binarization method of FIG. 13, the binarization threshold T is calculated at 1304 as $T=a_0+a_1 m+a_2 s+a_3 v$ and each pixel in image I with a pixel value smaller than T is set to 0 and each pixel with a pixel value larger than T is set to 255 at step 1305 to produce the binary edge image at 1306.

The data threshold and histogram data stored in the file or database may be sorted by the value of the threshold. In such case, the sorted matrix has the following format:

| Threshold | Mean  | Standard Deviation | Variance |
|-----------|-------|--------------------|----------|
| 19        | 11.2  | 7.36               | 54.1696  |
| 21        | 12.15 | 7.58               | 57.4564  |
| 32        | 16.21 | 11                 | 121      |
| 33        | 18.17 | 9.62               | 92.5444  |
| 49        | 23.31 | 13.5               | 182.25   |
| 55        | 18.99 | 11.88              | 141.1344 |
| 56        | 15.52 | 10.02              | 100.4004 |
| 60        | 14.85 | 9                  | 81       |
| 65        | 30.03 | 14.53              | 211.1209 |
| 66        | 30.1  | 15.19              | 230.7361 |

-continued

| Threshold | Mean | Standard Deviation | Variance |
|---|---|---|---|
| 66 | 31.97 | 17.02 | 289.6804 |
| 67 | 21.48 | 15.24 | 232.2576 |
| 70 | 23.03 | 15.04 | 226.2016 |
| 72 | 24.13 | 13.58 | 184.4164 |
| 77 | 21.4 | 11.22 | 125.8884 |
| 85 | 35.59 | 17.99 | 323.6401 |
| 89 | 35.08 | 19.71 | 388.4841 |
| 96 | 25.01 | 14.23 | 202.4929 |
| 100 | 31.81 | 17.03 | 290.0209 |
| 104 | 43.77 | 30.11 | 906.6121 |
| 109 | 39.03 | 23.27 | 541.4929 |
| 115 | 32.29 | 16.47 | 271.2609 |
| 140 | 43.05 | 23.26 | 541.0276 |
| 182 | 46.28 | 27.07 | 732.7849 |
| 201 | 52.93 | 29.55 | 873.2025 |
| 215 | 67.37 | 29.77 | 886.2529 |
| 243 | 69.5 | 33.96 | 1153.2816 |
| 255 | 55.25 | 27.93 | 780.0849 |
| 255 | 53.99 | 26.35 | 694.3225 |
| 255 | 86.67 | 44.69 | 1997.1961 |
| 255 | 111.64 | 53.79 | 2893.3641 |

As noted above with respect to FIGS. 10 and 13, once the data prepared in this way, the mathematical relationship between the threshold and mean, standard deviation, and variance is constructed by fitting a third degree polynomial curve $T = a_0 + a_1 m + a_2 s + a_3 v$ to this data set. Curve fitting is common knowledge with those having ordinary skill in mathematical modeling. In an exemplary implementation, the vector of coefficients $A = [a_0\ a_1\ a_2\ a_3]^T$ is found using a minimum mean square error algorithm (MMSE). Using the above 31 images as an example, the procedure to fit the curve is as follows:

(1) Construct a 31×4 matrix $X = [I\ M\ S\ V]$, where I is an identity column vector, M is a column vector containing the mean values of the images, S is the column vector containing the standard deviations of the images, and V is the column vector containing the variances of the images.

(2) Construct a 31×1 column vector Y containing 31 binarization threshold values.

Find A that minimizes the mean square error $e = (Y - X \cdot A)^T \cdot (Y - X \cdot A)$. For example, in an exemplary embodiment the MATLAB program was used to implement the MMSE algorithm and A was computed using MATLAB code:

$X = [\text{ones}(\text{size}(M))\ M\ S\ V];$ $A = X \backslash T.$

Once the value of A is calculated, the threshold value of any image based on the mean (m), standard deviation (s), and variance (v) of the image histogram may be calculated using the following formula:

$T = [1\ m\ s\ v] \cdot A$

When the above algorithm is applied to the data displayed in the table above, the resulting values for the A vector are: $[-67.306\ 4.4275\ 4.2539\ -0.132]^T$. In other words, for a given image, once statistical information such as the mean (m), standard deviation (s), and variance (v) of the histogram of a given image are calculated, the optimal binarization threshold can be calculated using the following formula:

$T = -67.306 + 4.4275m + 4.2539s - 0.132v$

Figure 14:
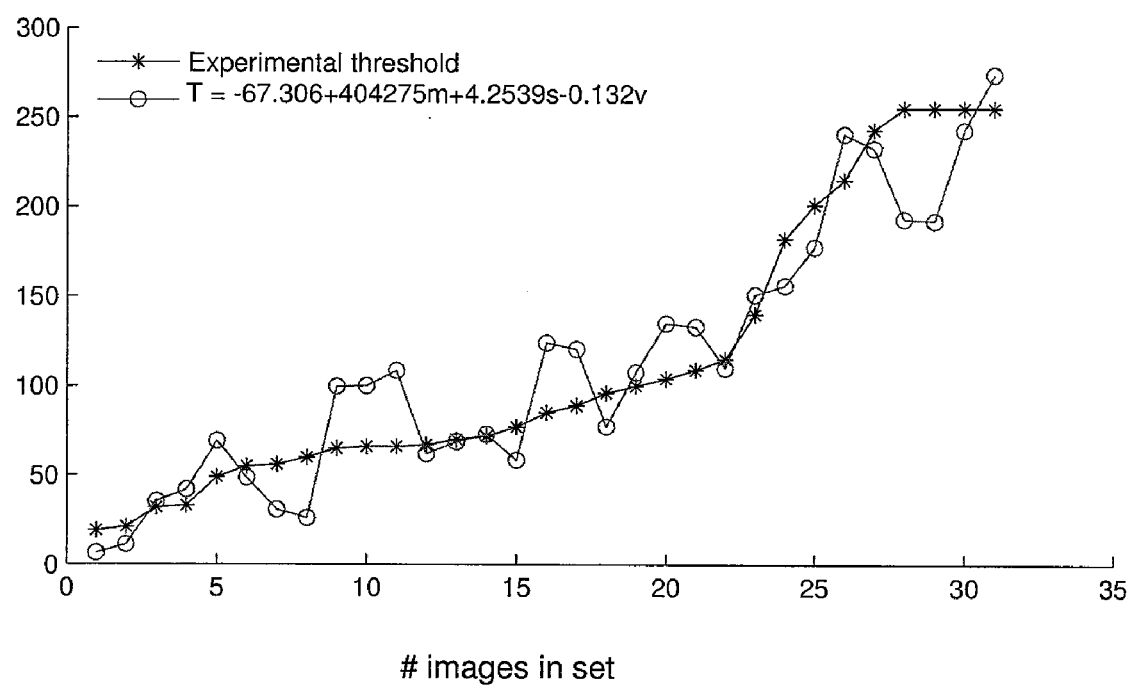
FIG. 14 illustrates a graph of the manually determined thresholds and the thresholds calculated using the binarization threshold method of the invention.

FIG. 14, shows the graph of the threshold values as they are coded manually and as they are calculated using the above equation.

In the above examples, only 31 noisy images were used to decide the correlation between noise edge distribution and edge binarization threshold. The decided curve might not be close enough to the real situation. There is no reason that the decided formula can not be changed if there are more images available.

The technique described with respect to FIGS. 10-14 reduces the noise significantly; however, if the original image contains relatively strong noise, there will still be a noise remainder. Therefore, further operations are desirable to remove the remaining noise. Such further operations are described below.

Despeckling to Further Reduce Noise

When preparing scanned documents for optical character recognition (OCR), it is important to reduce the noise in the image. This preprocessing of the image improves the accuracy of the optical character recognition. Documents, such as receipts, that are of poor quality pose a special challenge regarding image processing. Moreover, if there exists relatively strong noise on the original image, de-noising relying only on edge binarization is often not enough. In an exemplary embodiment, it is further desirable to evaluate the noise level of the image first and perform despeckling to reduce more noise if necessary. Generally speaking, this process proceeds as follows.

1. Extract all edge connected components (white components) from the binary edge image.

2. All small components are potentially noise components and thus should be recorded for evaluation. In an exemplary embodiment, for an image scanned using 300 DPI, components with dimension smaller than 5×5 or with pixel number less than 12 were considered noise candidates. Of course, other sizes of components could be considered noise candidates as desired. For another scanning resolution, $R_{DPI}$, the dimension threshold should be changed to $$\frac{R_{DPI}}{60} \times \frac{R_{DPI}}{60}$$

and the pixel number threshold should be changed to $$\frac{R_{DPI}}{25}$$

to make them adapt to any scanning resolution.

3. If the number of stored noise candidate components for the whole image is large enough (larger than 1% of the total number of components), then continue the processing to reduce more noise and refine text areas. Otherwise, stop the processing here.

4. Compute the edge histogram $h_e$ of all those noise candidates using the non-binary but normalized edge image.

5. Compute an edge threshold $E_{th}$ from the total number of noise candidate pixels.

6. Go over all pixels covered by noise candidate components and set pixels with edge smaller than $E_{th}$ to background.

Figure 15:
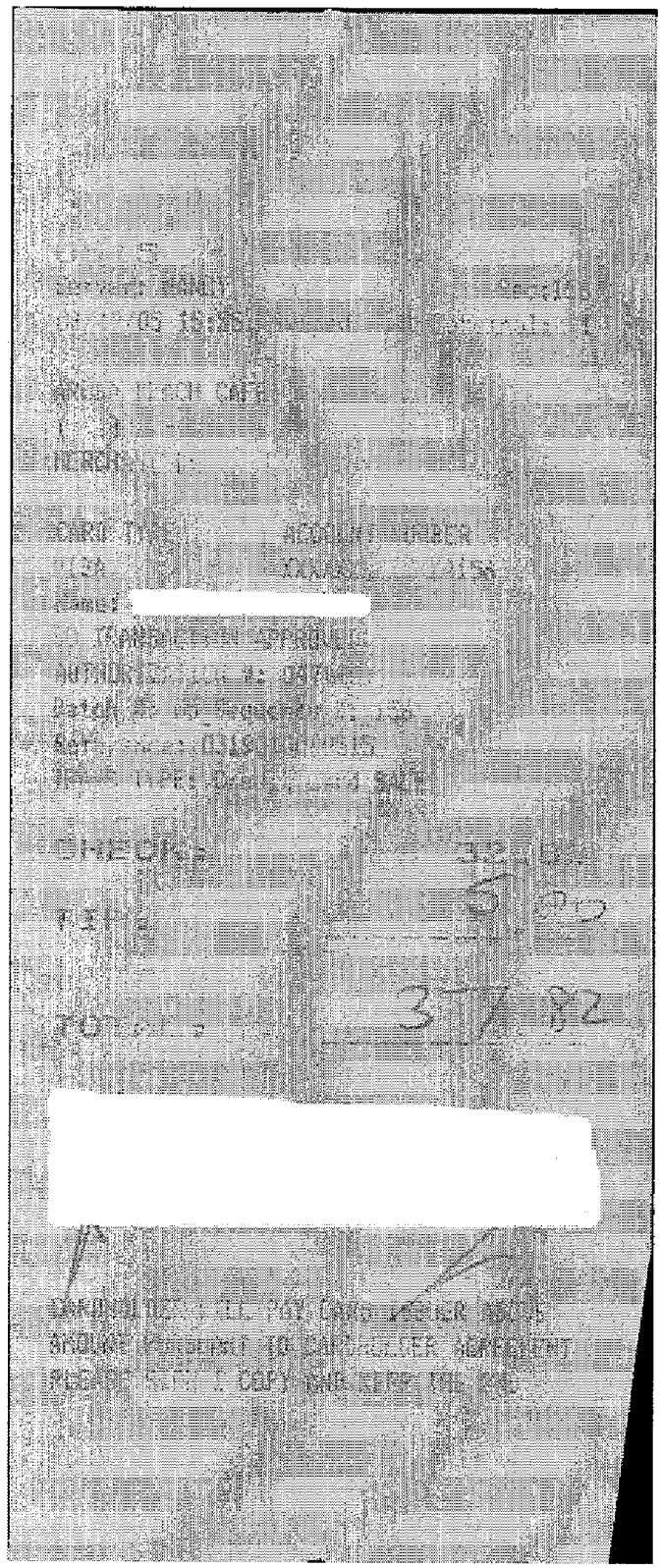
FIG. 15 illustrates the scanned image of a receipt for despeckling in accordance with an embodiment of the invention.
Figure 16:
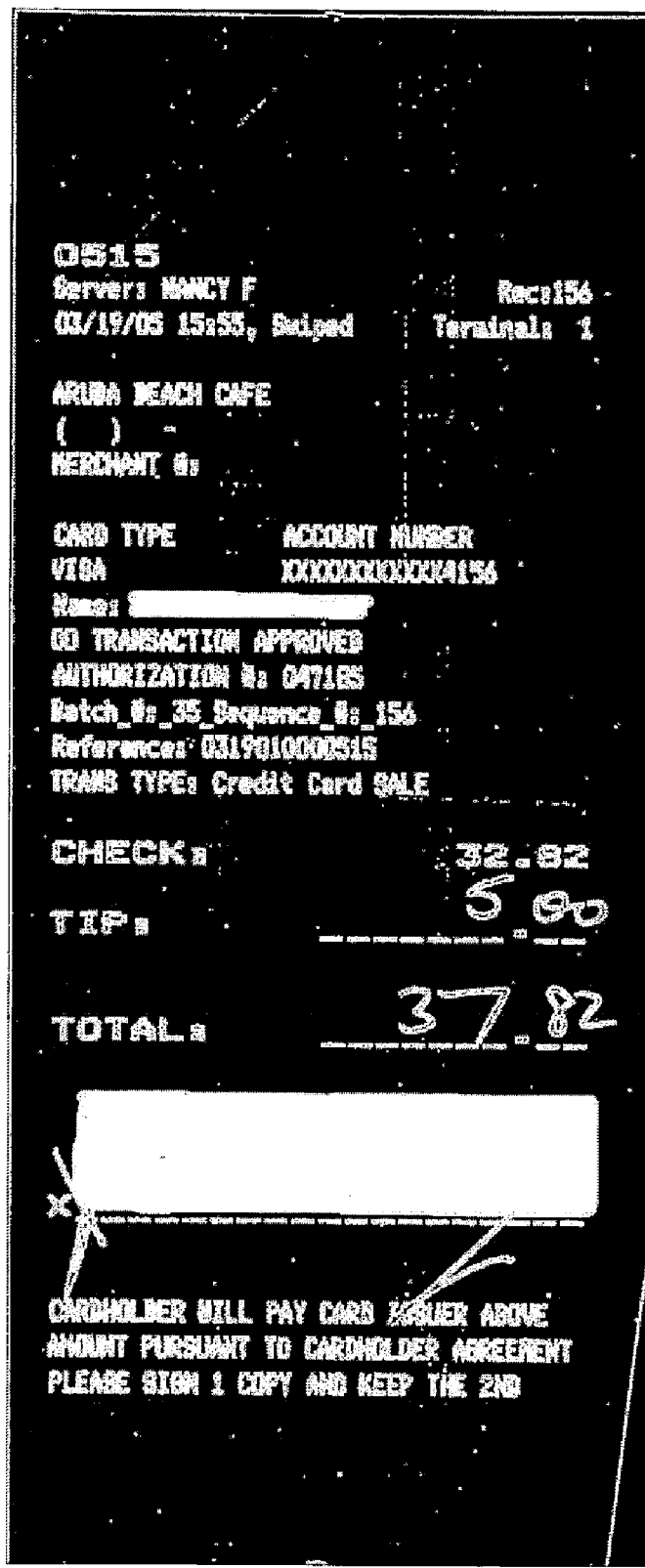
FIG. 16 illustrates the image of the receipt of FIG. 15 after edge detection and binarization.
Figure 17:
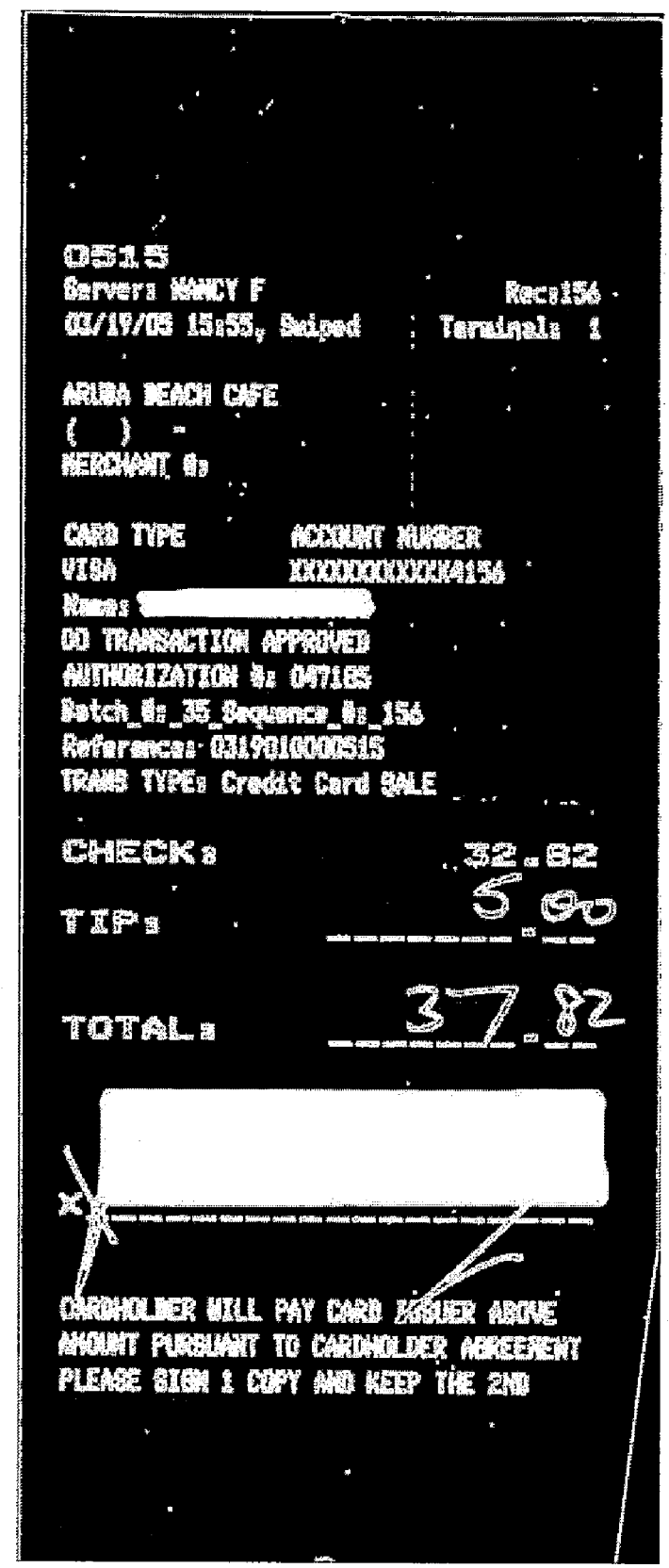
FIG. 17 illustrates the image from FIG. 16 after reduction of the number of speckles in the image using the method of an embodiment of the invention.
Figure 18:
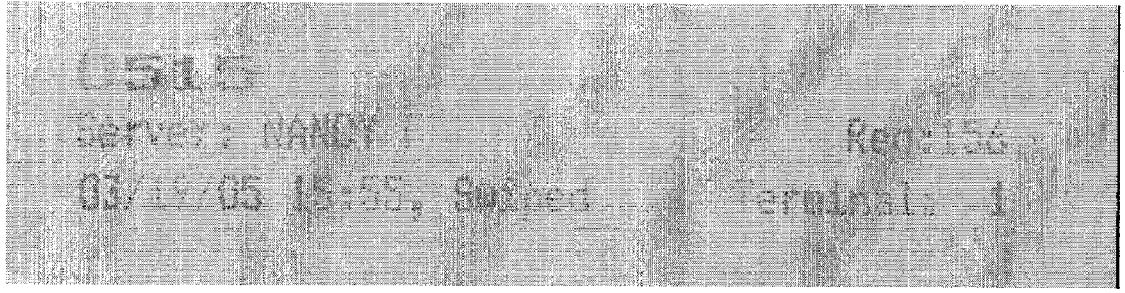
FIG. 18 illustrates a close-up of the receipt image from FIG. 15.
Figure 19:
FIG. 19 illustrates a close-up of the edge image from FIG. 16 that has been inverted for illustration purposes.
Figure 20:
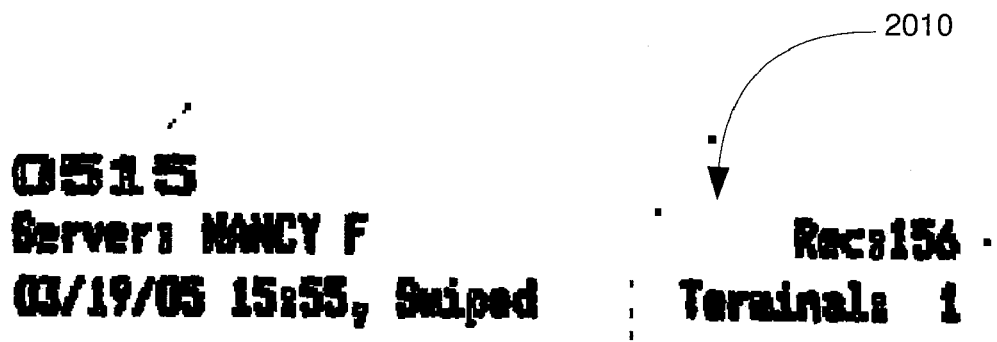
FIG. 20 illustrates a close-up of the image from FIG. 19 after it has been despeckled by the methods of the invention.
Figure 21:
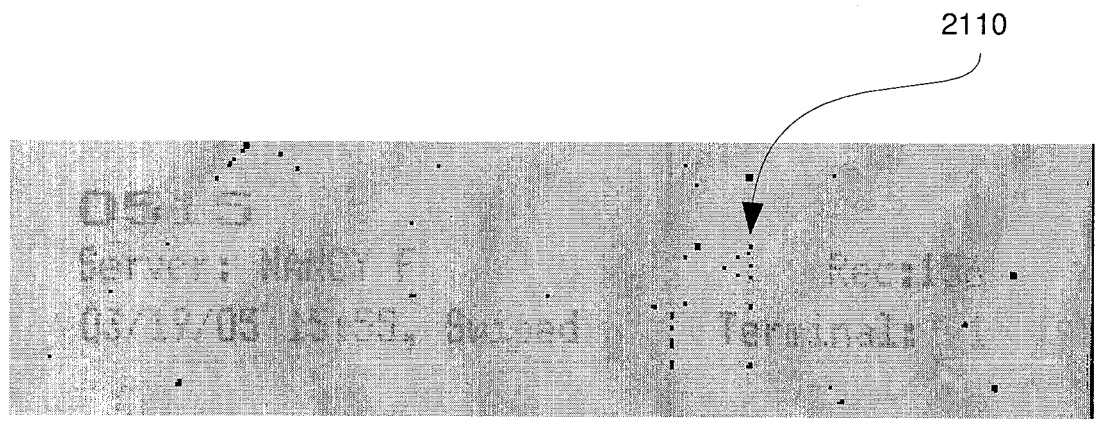
FIG. 21 illustrates the noise candidate speckles superimposed on the close-up of the original image from FIG. 15.
Figure 22:
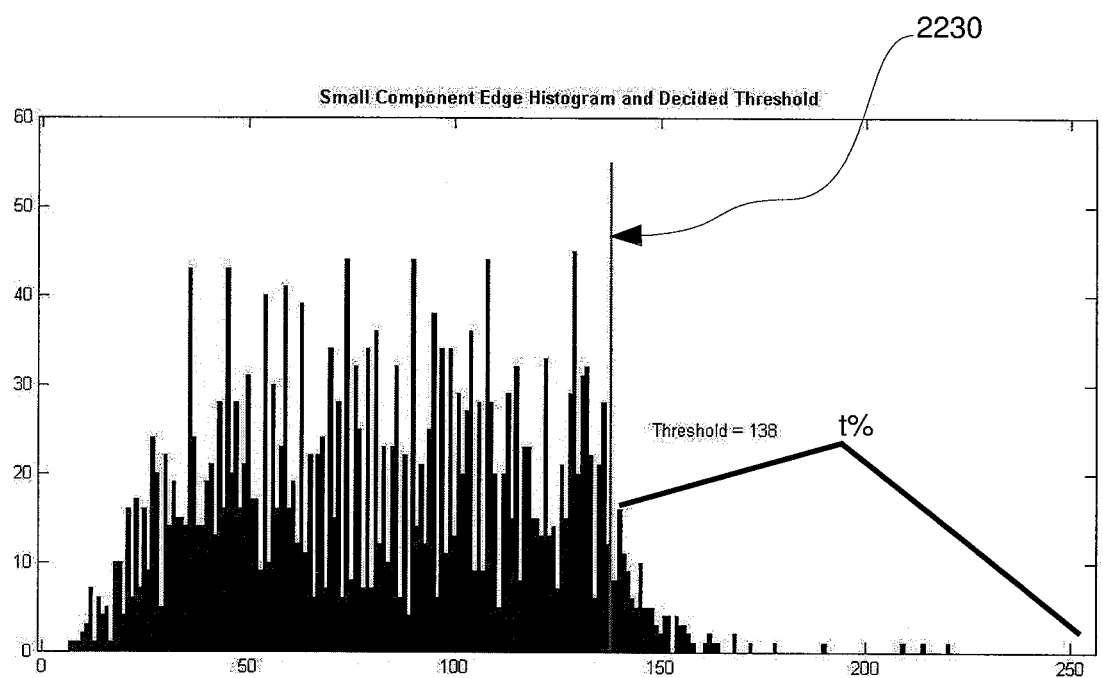
FIG. 22 illustrates the histogram of the parts of the image of FIG. 15 covered by the noise candidates.

FIG. 15 illustrates an image of a scanned receipt that needs to be prepared for OCR using the despeckling technique of the exemplary embodiment. FIG. 16 illustrates the image of the receipt of FIG. 15 after edge detection and binarization as described above, while FIG. 17 illustrates the image from FIG. 16 after reduction of the number of speckles in the image using the despeckling method described herein. It is clear that a significant amount of small noise is present in the image of FIG. 16 that is not present in FIG. 17. FIG. 18 illustrates a close-up of the receipt image from FIG. 15. FIG. 19 illustrates a close-up of the edge image from FIG. 16 that has been inverted for illustration purposes, while FIG. 20 illustrates a close-up of the image from FIG. 19 after it has been despeckled by the methods of the invention. Clearly, fewer noise elements 2010 are present in FIG. 20 than noise elements 1910 present in FIG. 19. FIG. 21 illustrates the noise candidate speckles 2110 superimposed on the close-up of the original image from FIG. 15, while FIG. 22 illustrates the histogram of the parts of the image of FIG. 15 covered by the noise candidates.

Figure 23:
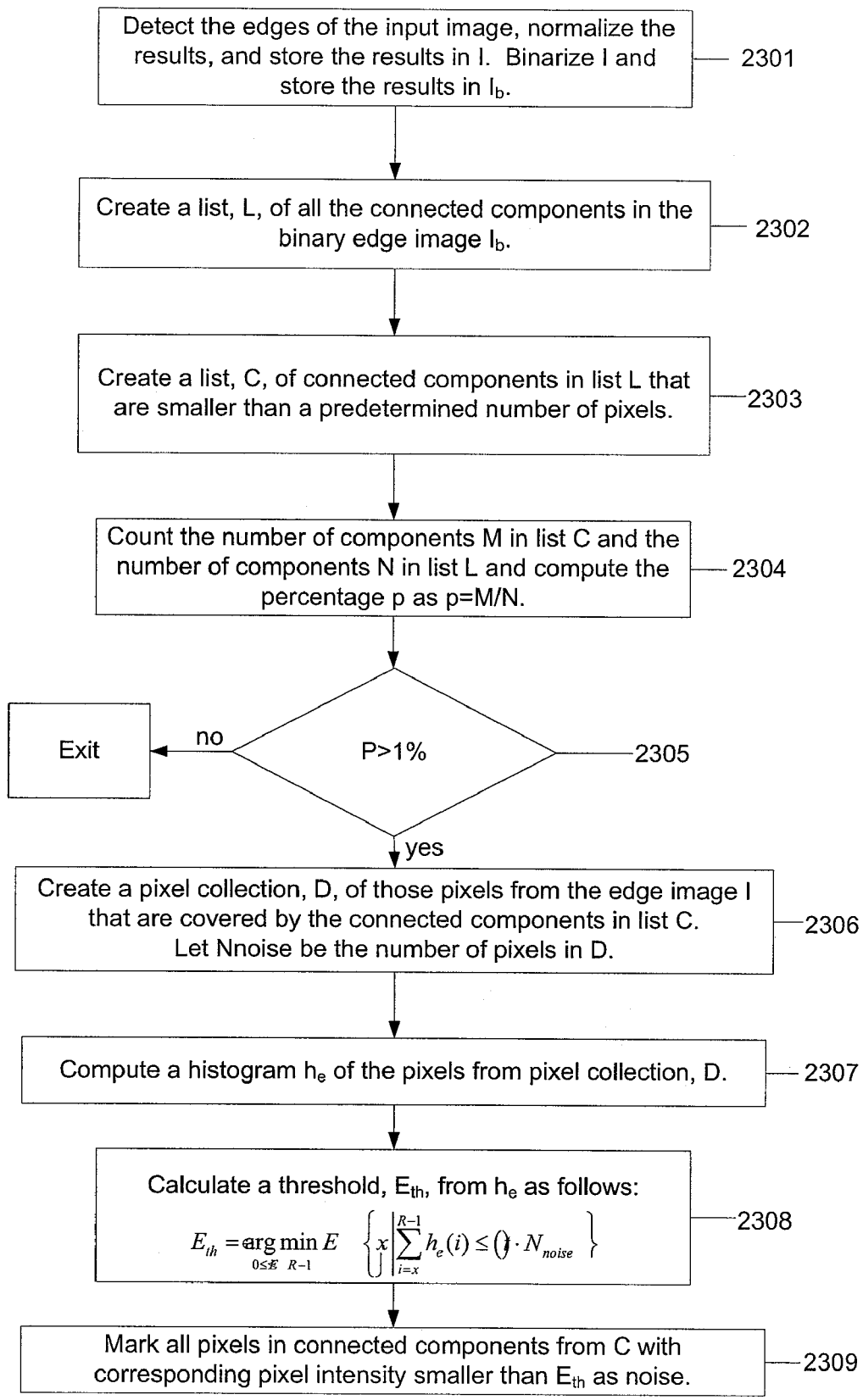
FIG. 23 illustrates a flow chart of the method of despeckling the image in accordance with the invention.

FIG. 23 illustrates a flow chart of the method of despeckling the image in accordance with the invention. Starting at 2301, the edges of the input image are detected and the edge-detected image is normalized to values of 0-255 (for R=256). The result is stored in I. The resulting image I is then binarized and the results are stored in $I_b$. Both of these procedures are known in the art of image processing. The procedure for eliminating the specular noise then proceeds as follows.

First, at step 2302 all the white connected components in the binary edge image $I_b$ displayed in FIG. 16 are found and a list, L, of all of the connected components is created. Finding connected components in images is known in the art of image processing.

Second, all the connected components that are smaller than 5×5 pixels or with less than 12 pixels are considered as noise candidates at 2303. These are the thresholds used in an exemplary embodiment; other thresholds for noise candidates can be used when appropriate. The result is a list, C, of connected components that are considered noise candidates. So, in the image from FIG. 19, all the speckles in the 1910 area are considered noise candidates. Clearly, there are other noise candidates in this image.

Third, the number of components M in list C is counted and the number of components N in list L is counted. The percentage of noise candidates M to the number of all connected components N is computed as the percentage p=M/N at 2304. If the number of noise candidates M in the list is greater that 1% of the total number of connected components N at 2305, then processing of the noise candidates proceeds. Otherwise, no further processing is necessary and processing exits. This step may be eliminated in alternative embodiments of the invention. Also, the 1% threshold can also be modified in alternative embodiments of the invention.

Fourth, for each noise candidate, the corresponding area of the original image that is covered by the noise candidate is found at 2306. This collection of pixels D represents those pixels from the edge image I that are covered by the connected components in list C. The number of pixels in D are denoted by $N_{noise}$. FIG. 21 shows the noise candidates overlayed onto the original receipt image. The dots, 2110, are masks that are used to pick out the relevant pixels from the original image. This step creates a collection of pixels from the original image that are covered by the noise candidates.

Fifth, at 2307, a histogram $h_e$ of the collection of pixels assembled at 2306 is computed. FIG. 22 shows the histogram of the collection of pixels from 2306. In this histogram, the original gray scale image under the speckle candidates is pulled out in a mask and the original image is purged of noise candidates that exceed threshold 2230. In this case, t % of the noise candidates are to the right of the threshold 138.

Sixth, at 2308, the threshold, $E_{th}$, is calculated from the histogram $h_e$ using the following formula:

$$E_{th} = \operatorname*{arg\,min}_{0 \leq E \leq R-1} E \in \left\{ x \,\middle|\, \left| \sum_{i=x}^{R-1} h_e(i) \right| \leq (t \cdot N_{noise}) \right\}$$

where $N_{noise}$ is the total number of noise candidate pixels, and t is the threshold that is empirically determined. R is typically 256 but may vary depending upon the grayscale resolution.

Finally, at 2309, the threshold calculated at 2308 is used to eliminate specular noise. This is accomplished by examining each of the pixels in the noise candidates. If corresponding pixels from the original image are smaller than $E_{th}$ in value, then the noise candidate pixel is set to the background color. The result of the filtering is displayed in FIG. 20. The area 2010 shows that there are no speckles in the area where they were present in area 1910 of FIG. 19.

The binary edge image with noise correction as described above is now ready to process to detect the text. The object text areas are identified and enhanced. Since the detected text areas are well defined, the enhancement of original images can be easily transformed to object image enhancement. The approach described below selectively enhances the detected text area and suppresses the background noise impact simultaneously.

Create Text and Background Picking Mask

Given a binary edge image as processed above, the text picking mask can be easily defined using connected components on the binary image. Assuming the given image is the result image right after the text detection, which is a negative binary image, then the text picking mask consists of positions of all white pixels on the input image. The purpose of the background picking mask described herein is to enable calculation of a background color that would make textual documents easy to binarize. Not as simple as the creating of text picking mask, the way to create the background picking mask is a little bit tricky. In order to suppress the impact of background noise maximally, instead of setting the background pixel to a white value, the background pixel value is computed as follows:

1. Dilate the input binary edge image $S_1$ to generate a new binary edge image $S'_1$.
2. Optionally perform hole filling to all white connected components on image $S'_1$ to generate another new image $S_2$.
3. Compute the difference image $S_{dif}$ of $S_1$ and $S_2$, where $S_{dif} = |S_1 - S_2|$.
4. All pixels on image $S_{dif}$ with non-zero values will be considered background pixels.
5. Compute the average of all decided background pixel values from the original input image. This value is the background value that can be used to generate the object image.

FIGS. 24-41 illustrate an exemplary embodiment of the invention whereby such a background picking mask creating procedure is used to select a detected text component "AUTH" by way of example. The same procedure will happen to each text component on the given image, and the average background pixel values will be used as the final background pixel value.

Figure 24:
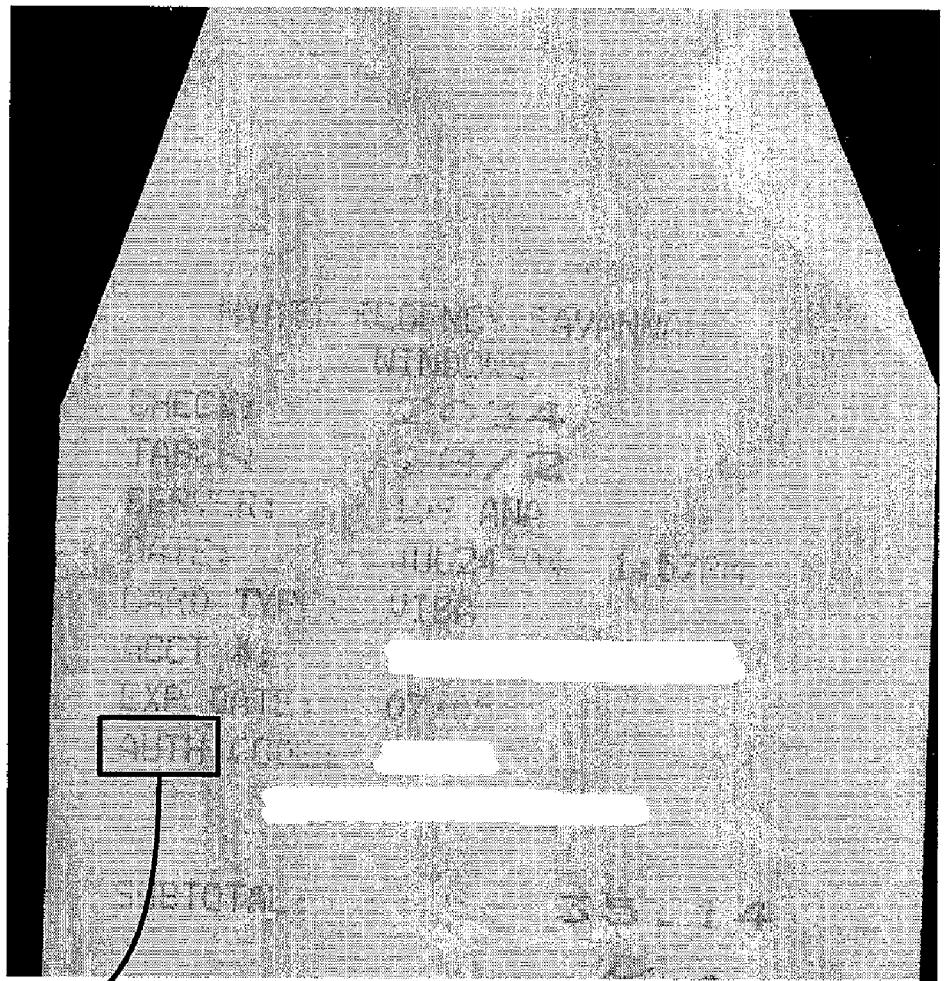
FIG. 24 illustrates the original document image, a receipt, for background color calculation in accordance with an embodiment of the invention.

FIG. 24 illustrates the original document image, a receipt, for background color calculation in accordance with an embodiment of the invention. The credit card number and other private information has been blanked out in this image. The "AUTH" word, 2401, is the word that will be used to illustrate the implementation of the background picking mask in accordance with the method illustrated in FIG. 41.

Figure 25:
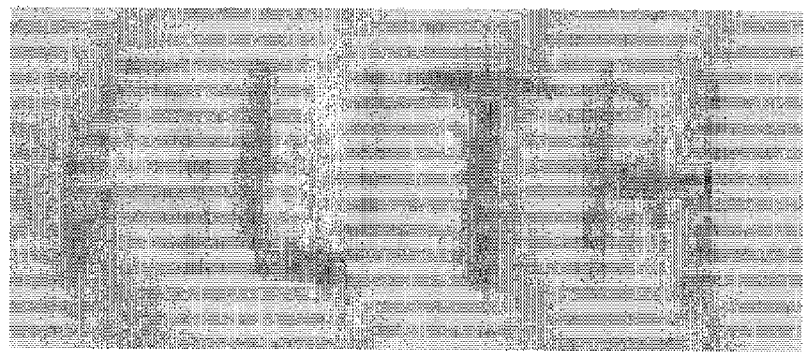
FIG. 25 illustrates a section of the original document image of FIG. 24.

FIG. 25 illustrates a close-up of the "AUTH" word as it appears in the original document illustrated in FIG. 24. FIG.

26 shows the text mask of the "AUTH" word. This text mask is constructed by detecting the edges of the original image and binarizing the detected edge image at 4101. Edge detection is a commonly known image processing technique known in the art. For example, the open-source image processing software "GIMP" has multiple procedures available for edge detection. In an exemplary embodiment, an "edge filling" and "hole filling" procedure is used at 4102 to fill in the gaps that are present in letters such as "A" to get an updated binary edge image S1.

Figure 27:
FIG. 27 illustrates the dilated text mask of the section of the document image of FIG. 25.

FIG. 27 shows the text mask of the "AUTH" word after it has been dilated at 4103 to create image S2. Dilatation increases the thickness of the text mask by a fixed number of pixels. In an exemplary embodiment, the thickness is increased by one pixel. Dilatation is also a commonly used image processing technique known in the art. For example, the open-source image processing software "GIMP" has procedures for dilation.

Figure 26:
FIG. 26 illustrates the text mask of the section of the document image of FIG. 25.
Figure 28:
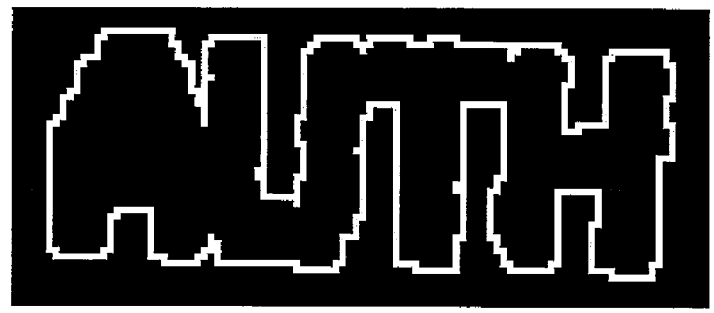
FIG. 28 illustrates the text boundary mask of the section of the document image of FIG. 25.

FIG. 28 shows the text boundary mask. This mask is derived by doing an exclusive or (XOR) operation on the image S1 in FIG. 26 and the image S2 in FIG. 27 at 4104. Specifically, each pixel in FIG. 28 is calculated as a XOR of the corresponding pixels in FIG. 26 and FIG. 27. In other words, the pixel in FIG. 28 is white if only one of the corresponding pixels in FIGS. 26 and 27 are white. If both pixels are white or both pixels are black, then the corresponding pixel in FIG. 28 is black. This mask selects the pixels forming text boundary S3 that surround the "AUTH" text.

Figure 29:
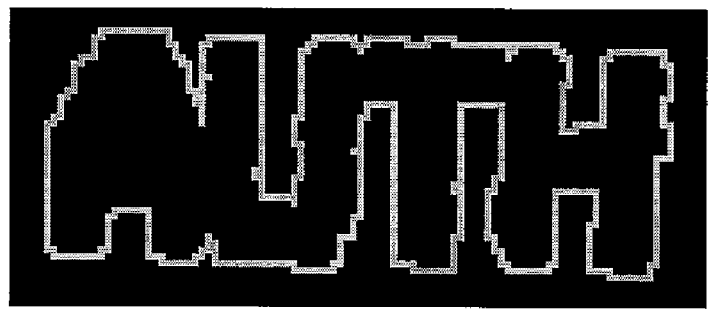
FIG. 29 illustrates the text boundary mask superimposed on the section of the document image of FIG. 25.
Figure 30:
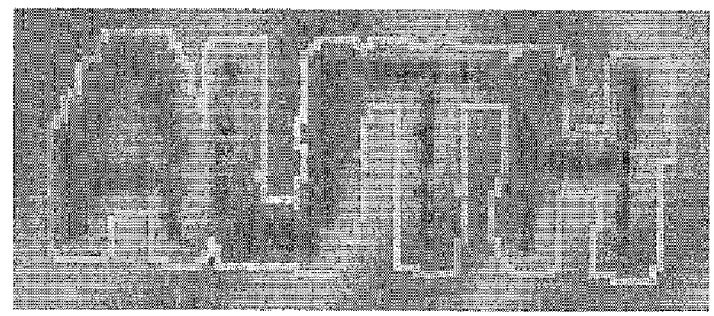
FIG. 30 illustrates the part of the original image of FIG. 24 that is covered by the text boundary mask.

FIG. 29 illustrates the text boundary mask S3 superimposed on the section of the document image of FIG. 25 at 4105. Careful comparison of FIGS. 28 and 29 reveals that the text boundary mask of FIG. 28 is white, while the text boundary shown in FIG. 29 assumes the color of the background of the original image from FIG. 25. Specifically, each pixel from FIG. 29 is composed using the following pseudocode:

if p28 (x,y) is white then set p29 (x,y) to p25 (x,y), otherwise set p29 (x,y) to black, where p25(x,y), p28(x,y), and p29(x,y) are the value of the corresponding pixel at coordinates (x,y) of the image from FIGS. 25, 28, and 29, respectively. FIG. 30 illustrates the part of the original image of FIG. 24 that is covered by the text boundary mask S3.

Figure 31:
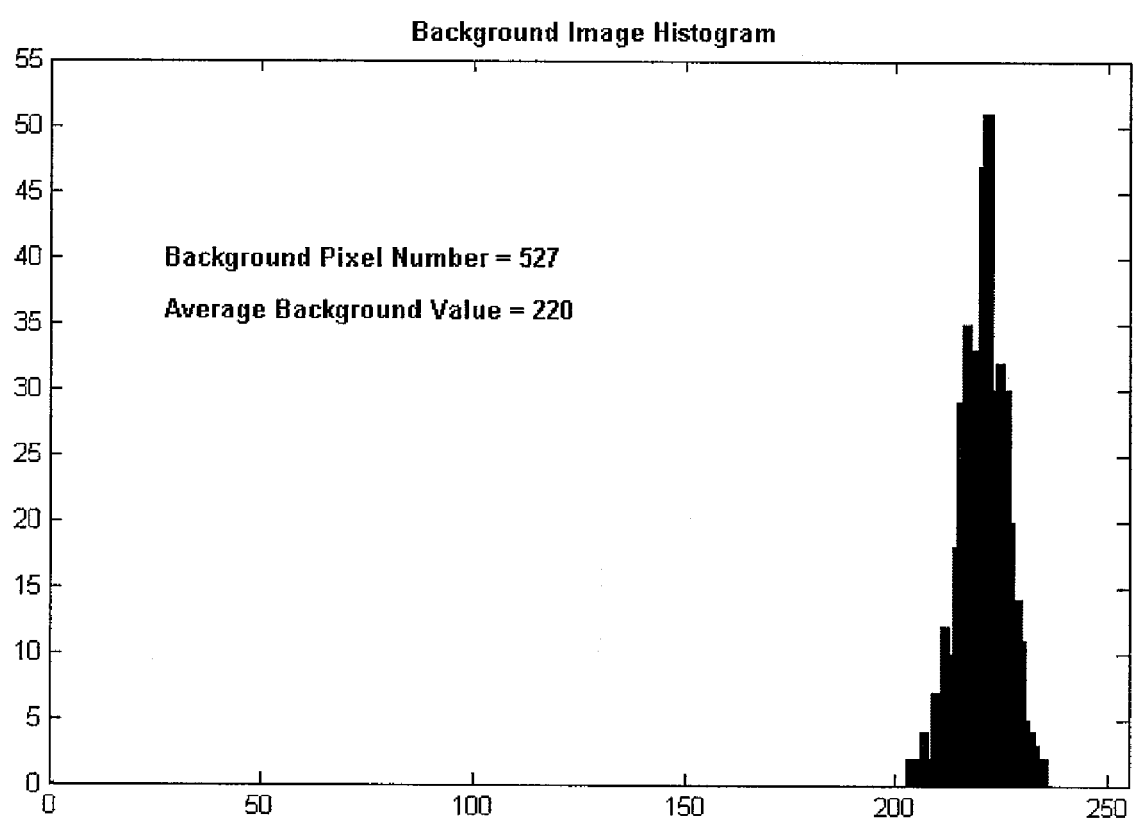
FIG. 31 illustrates the histogram of the image from FIG. 29 without the black colored pixels.

FIG. 31 illustrates the histogram of the non-black pixels of the image in FIG. 29. In other words, this histogram is calculated at 4106 using only those pixels covered by the text boundary mask S3. The histogram of FIG. 31 is used to calculate at 4107 the new background color, a, for the images by finding the average value of the non-black pixels. Specifically, in the image from FIG. 29, there are 527 non-black pixels that represent the background surrounding the text from the image from FIG. 25. The average value, a, of these pixels is 220. In the exemplary embodiment, the average value of the non-black pixels of FIG. 29 is used as the new background color for the image.

Figure 32:
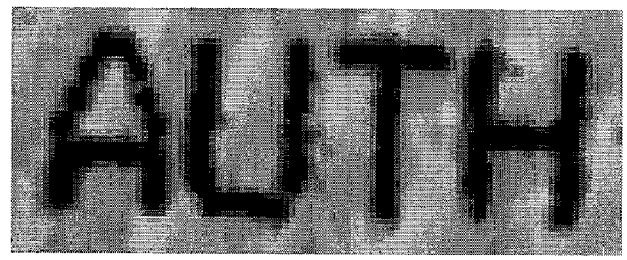
FIG. 32 illustrates the text of FIG. 25 that has gone through contrast adjustment in accordance with the invention.
Figure 33:
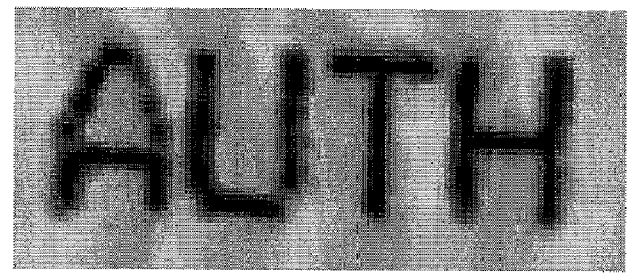
FIG. 33 illustrates the text of FIG. 25 that has gone through contrast and background color adjustment in accordance with the invention.

FIGS. 32 and 33 illustrate the application of the newly calculated background color a to the image at 4108. FIG. 32 shows a contrast adjusted image from FIG. 25. For example, the contrast adjustment could be a conventional contrast adjustment or the technique described in detail above. In FIG. 33, all the background pixels are turned into the calculated background color, 220 in the current example. Background pixels are all those pixels not covered by the text mask of image from FIG. 26.

Figure 34:
FIG. 34 illustrates the image from FIG. 32 that has been binarized.
Figure 35:
FIG. 35 illustrates the image from FIG. 33 that has been binarized.
Figure 36:
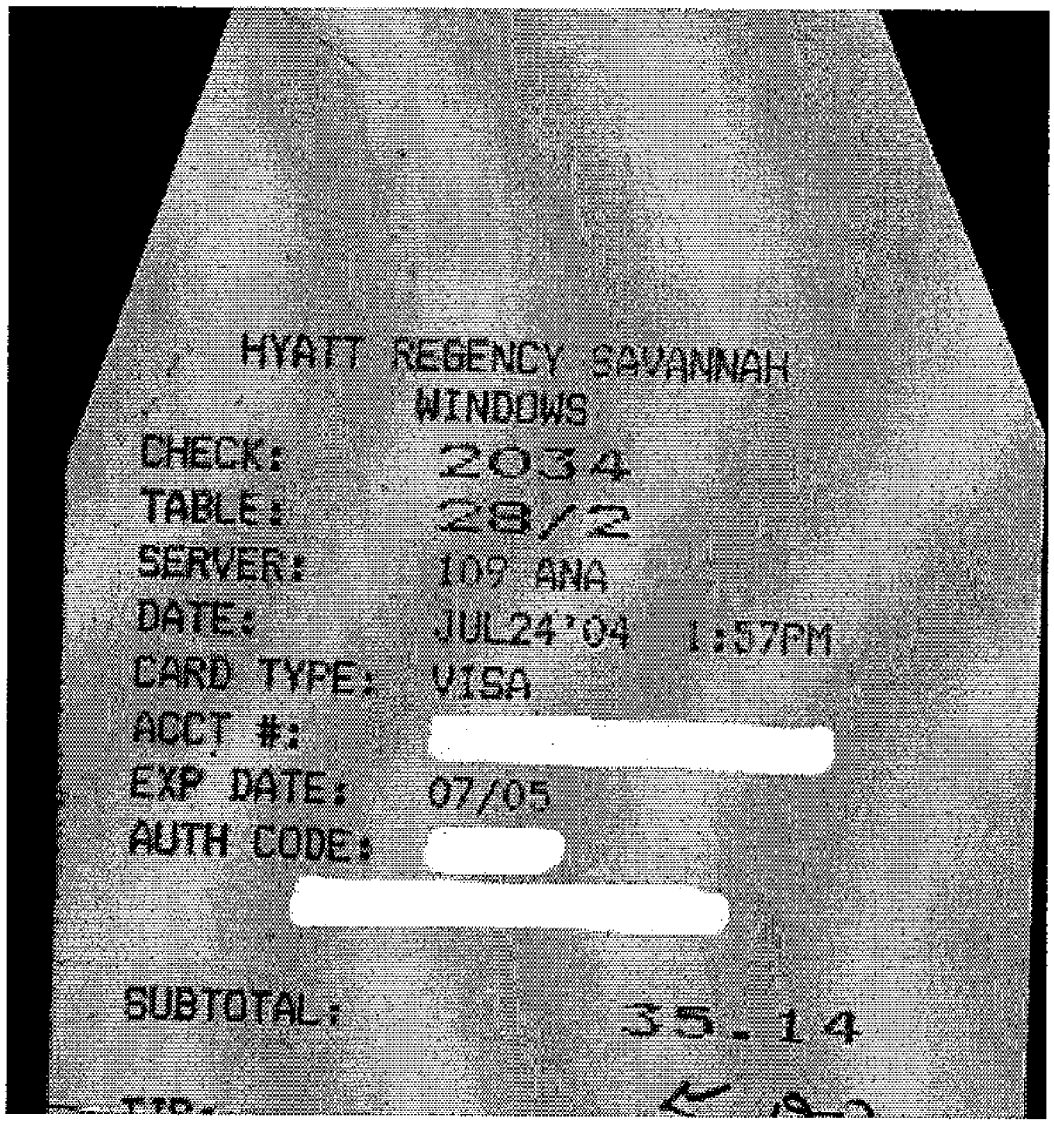
FIG. 36 illustrates the full image of the receipt of FIG. 24 with the background color adjusted.

FIGS. 34 and 35 show binarized versions of FIGS. 32 and 33, respectively. It is clear that the amount of noise in FIG. 35 is less than the amount of noise in FIG. 34. This difference in noise can lead to significantly more accurate OCR results for FIG. 35 than for FIG. 34. FIG. 36 illustrates the image from FIG. 24 after the background color is adjusted using the technique just described.

Figure 37:
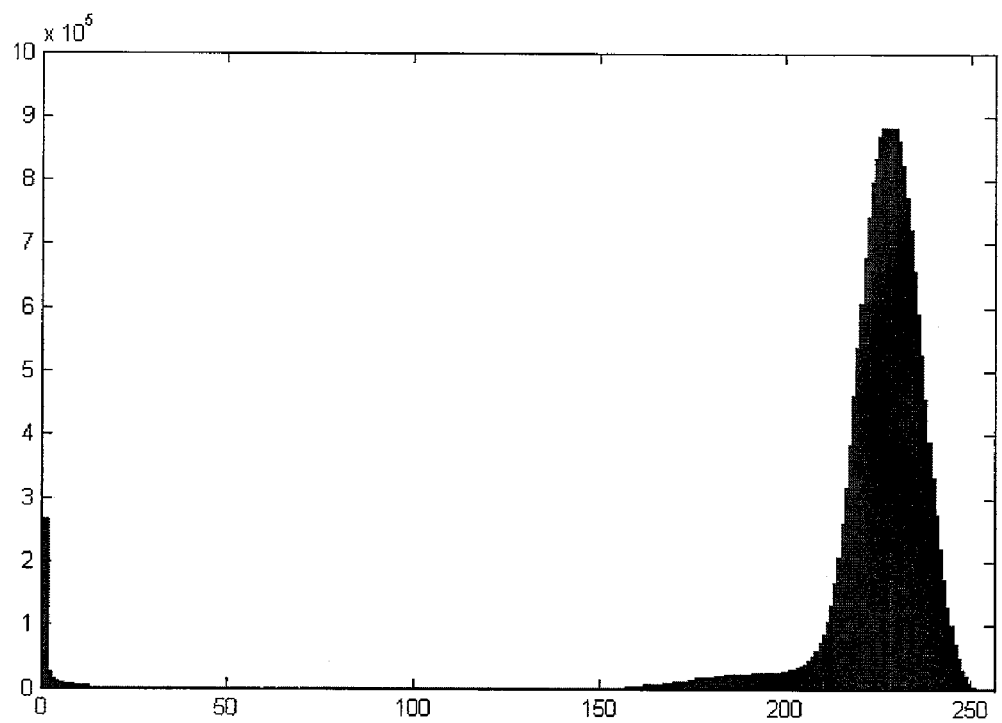
FIG. 37 illustrates the histogram of the original image from FIG. 24.
Figure 38:
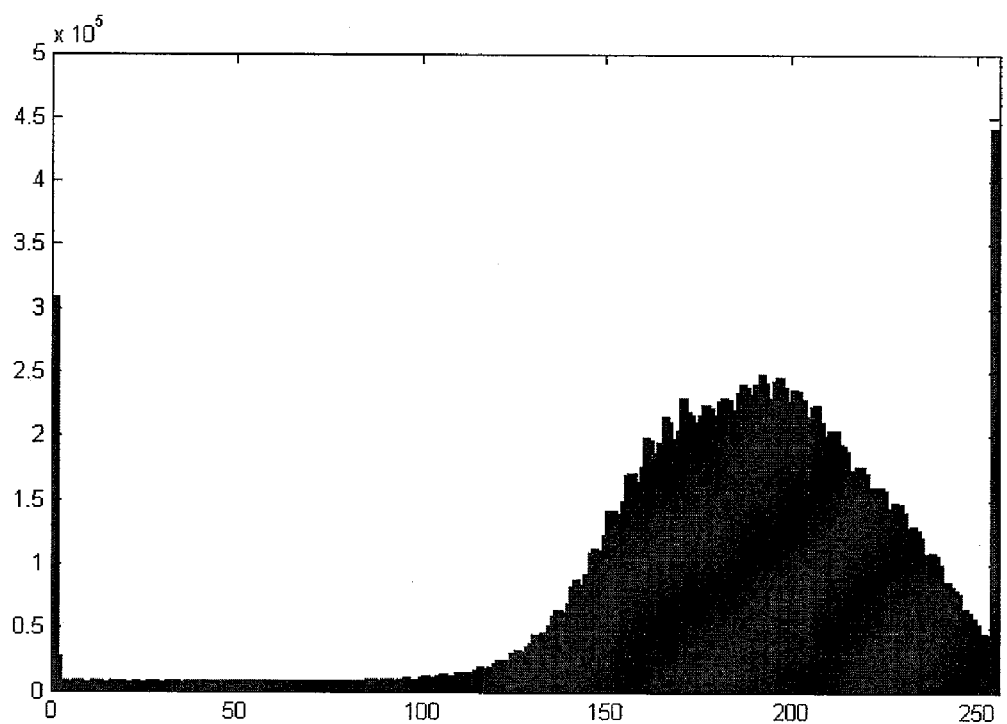
FIG. 38 illustrates the histogram of the contrast adjusted image as exemplified in FIG. 32.
Figure 39:
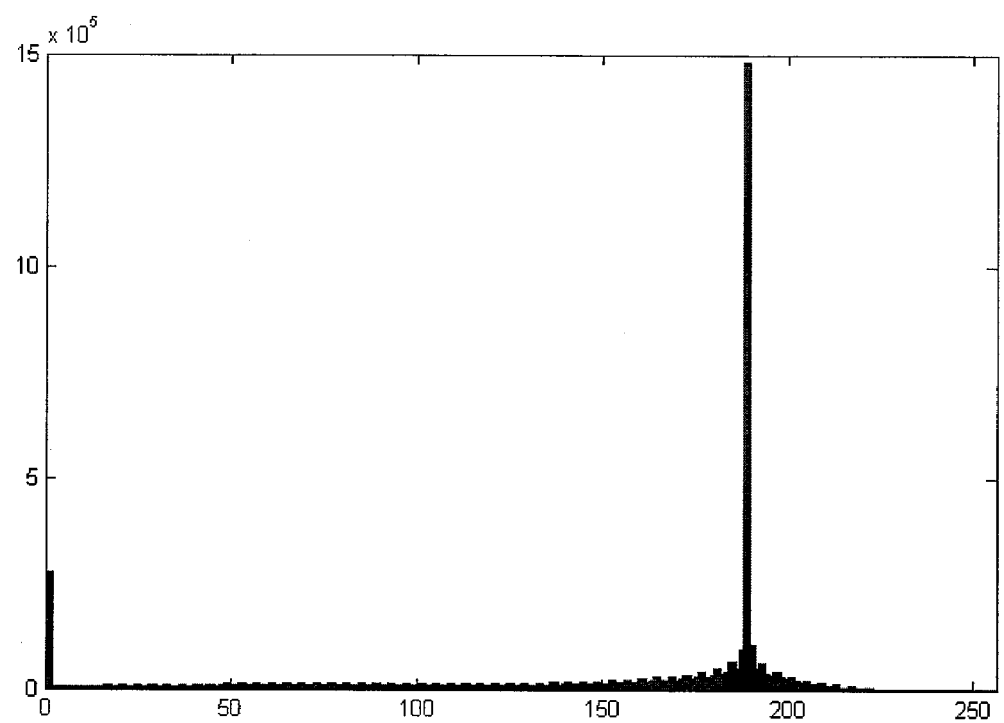
FIG. 39 illustrates the histogram of the contrast adjusted image with a new background color as shown in FIG. 34.
Figure 40:
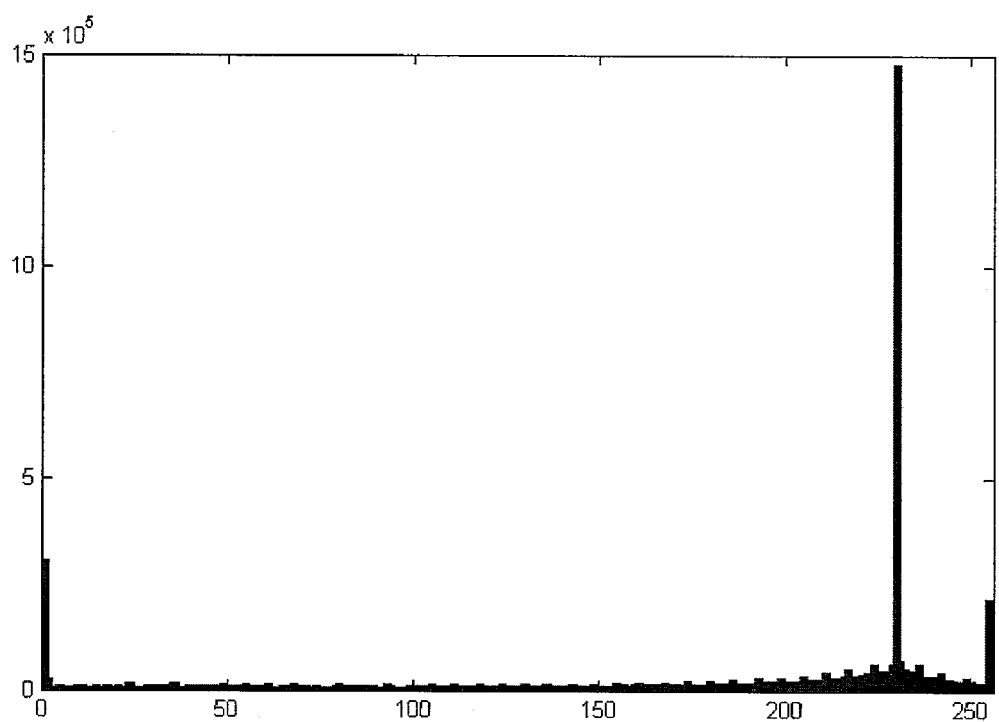
FIG. 40 illustrates the histogram of the image from FIG. 34 after being contrast adjusted once more.
Figure 41:
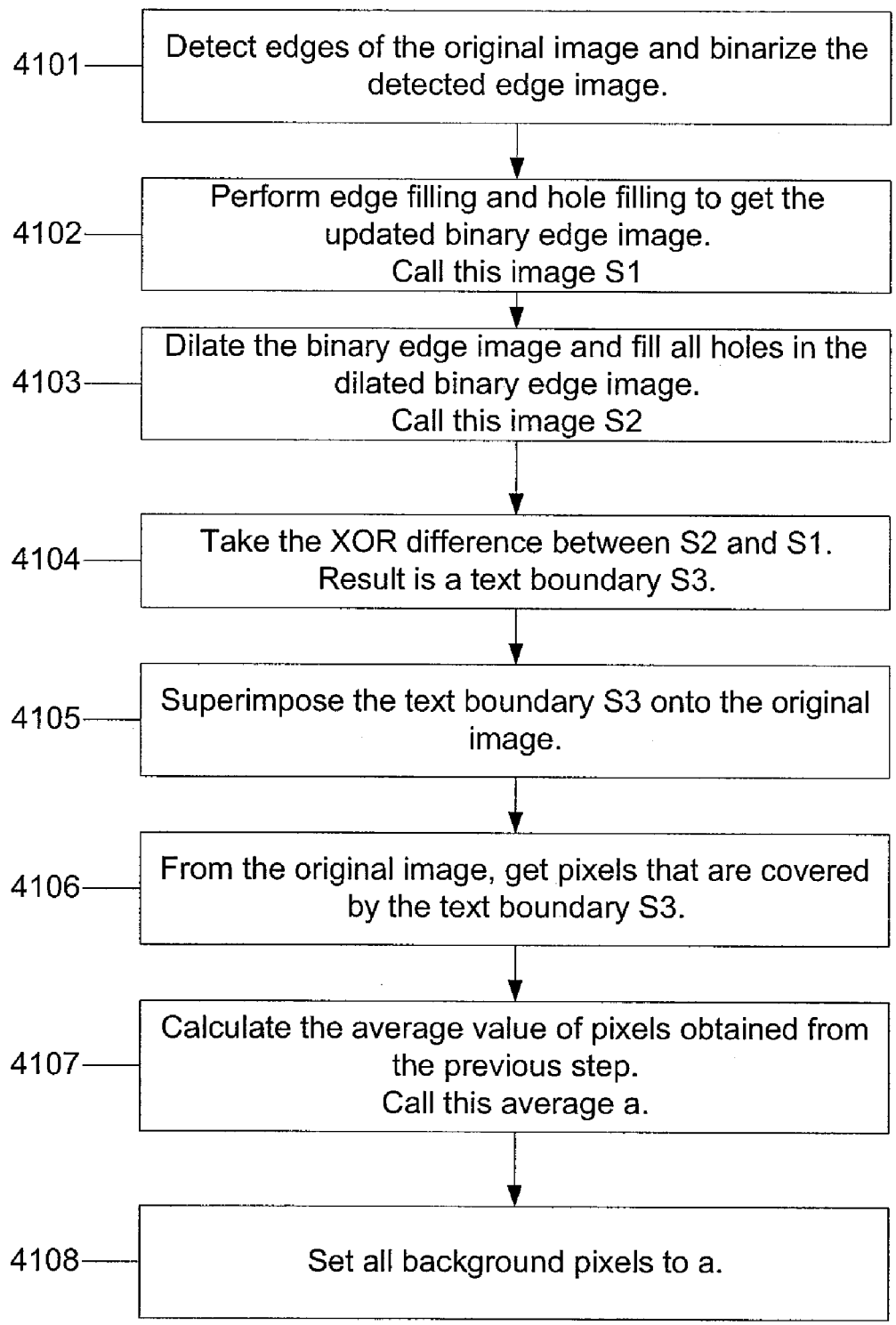
FIG. 41 is a simplified flow chart of an embodiment of the background color calculation method of the invention.

Numerous alternative embodiments are also possible within the scope of the invention. For example, the methods described herein may be used to enhance images to make it easier for optical character recognition (OCR) software to be more accurate. In order to fully appreciate these advantages of the invention, it is useful to examine the histograms of the images in various stages of the process described above. In particular, FIG. 37 illustrates the histogram of the original image of FIG. 24. FIG. 38 illustrates the histogram of the contrast adjusted image as exemplified by FIG. 32. FIG. 39 illustrates the histogram of the image exemplified in FIG. 33, which is the contrast adjusted image when the background was modified to the new color calculated in the process described above. FIG. 40 illustrates the histogram of the image from FIG. 33 further contrast adjusted. It should be noted that the histogram profile showed in FIG. 40 is more suitable for binarization and preparation for OCR processing.

By combining the techniques described above, it becomes apparent that the way to generate the best object image for OCR is to combine the enhancement of object texts and to suppress the background. In particular, after the selective enhancement of the object image (e.g. "AUTH"), the obtained image is a gray scale image with the following features:

Noise is reduced.

Contrast is adjusted.

Object texts stand out.

To get the best OCR result, before feeding this image to the OCR engine, a locally adaptive binarization approach may be applied to create a good binary image.

Various Embodiments

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for improving image processing in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the image processing using the methods of the present invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Those skilled in the art will appreciate that other image processing features besides those specifically described herein may be used with the techniques described herein. Such variations are intended to be included within the scope of the invention as defined by the following claims.

What is claimed:

1. A method of enhancing an image for optical character recognition, comprising:
    detecting the edges of the image to create an edge detected image;
    binarizing the edge detected image to create a binary edge image for processing;
    dilating the binary edge image to create a dilated binary edge image;
    taking the XOR difference between the binary edge image and the dilated binary edge image to obtain a text boundary;
    superimposing the text boundary on the image and determining the pixels of the image that are covered by the text boundary;
    calculating the average grayscale value of the pixels of the image that are covered by the text boundary; and
    setting background pixels of the image to the calculated average grayscale value of the pixels of the image that are covered by the text boundary.

2. A method as in claim 1, further comprising performing edge filling and hole filling on the binary edge image to create an updated binary edge image and filling holes in the dilated binary edge image to create an updated dilated binary edge image, whereby the XOR difference is taken between the updated binary edge image and the updated dilated binary edge image.

3. A method as in claim 1, further comprising binarizing the image after the background images have been set to the calculated average grayscale value of the pixels of the image that are covered by the text boundary.

4. A computer readable memory device having instructions thereon that when processed by a processor cause the implementation of a method of enhancing an image for optical character recognition, the method comprising:
    detecting the edges of the image to create an edge detected image;
    binarizing the edge detected image to create a binary edge image for processing;
    dilating the binary edge image to create a dilated binary edge image;
    taking the XOR difference between the binary edge image and the dilated binary edge image to obtain a text boundary;
    superimposing the text boundary on the image and determining the pixels of the image that are covered by the text boundary;
    calculating the average grayscale value of the pixels of the image that are covered by the text boundary; and
    setting background pixels of the image to the calculated average grayscale value of the pixels of the image that are covered by the text boundary.

5. The memory device as in claim 4, further comprising instructions for performing edge filling and hole filling on the binary edge image to create an updated binary edge image and filling holes in the dilated binary edge image to create an updated dilated binary edge image, and for taking the XOR difference between the updated binary edge image and the updated dilated binary edge image.

6. A memory device as in claim 4, further comprising instructions for binarizing the image after the background images have been set to the calculated average grayscale value of the pixels of the image that are covered by the text boundary.

7. A device for enhancing an image for optical character recognition, comprising:
    a scanner that scans the image to obtain a grayscale image; and
    a processor that processes the grayscale image by:
    detecting the edges of the image to create an edge detected image;
    binarizing the edge detected image to create a binary edge image for processing;
    dilating the binary edge image to create a dilated binary edge image;
    taking the XOR difference between the binary edge image and the dilated binary edge image to obtain a text boundary;
    superimposing the text boundary on the image and determining the pixels of the image that are covered by the calculating the average grayscale value of the pixels of the image that are covered by the text boundary; and setting background pixels of the image to the calculated average grayscale value of the pixels of the image that are covered by the text boundary.

8. A device as in claim 7, wherein the processor further performs edge filling and hole filling on the binary edge image to create an updated binary edge image and fills holes in the dilated binary edge image to create an updated dilated binary edge image, whereby the XOR difference is taken between the updated binary edge image and the updated dilated binary edge image.

9. A device as in claim 7, wherein the processor further binarizes the image after the background images have been set to the calculated average grayscale value of the pixels of the image that are covered by the text boundary.

* * * * *